US007111113B2

(12) United States Patent
Dahman et al.

(10) Patent No.: US 7,111,113 B2
(45) Date of Patent: Sep. 19, 2006

(54) APPARATUS AND METHOD TO WRITE INFORMATION TO AND/OR READ INFORMATION FROM AN INFORMATION STORAGE MEDIUM

(75) Inventors: Kirby G. Dahman, Tucson, AZ (US); Jon A. Lynds, San Jose, CA (US); John G. Thompson, Tucson, AZ (US); Ricardo Urbanejo, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 10/652,162

(22) Filed: Aug. 29, 2003

(65) Prior Publication Data

US 2005/0050265 A1    Mar. 3, 2005

(51) Int. Cl.
 G06F 12/00 (2006.01)
 G06F 7/00 (2006.01)
 G11B 5/09 (2006.01)
 G11C 15/00 (2006.01)
(52) U.S. Cl. .................. 711/111; 700/214; 707/204; 360/48; 711/4; 711/161; 711/162
(58) Field of Classification Search .............. None
 See application file for complete search history.

(56) References Cited

U.S. PATENT DOCUMENTS

| | | | |
|---|---|---|---|
| 4,775,969 A | 10/1988 | Osterlund | 369/53 |
| 5,375,145 A | 12/1994 | Abbott et al. | 375/98 |
| 5,502,811 A * | 3/1996 | Ripberger | 714/6 |
| 5,570,242 A | 10/1996 | Leonhardt et al. | 360/48 |
| 5,619,384 A | 4/1997 | Leonhardt et al. | 360/48 |
| 5,778,355 A | 7/1998 | Boyer et al. | 707/2 |
| 6,188,535 B1 * | 2/2001 | Lemke et al. | 360/70 |
| 6,226,441 B1 | 5/2001 | Hartung et al. | 386/46 |
| 6,237,062 B1 * | 5/2001 | Carlson et al. | 711/112 |
| 6,295,177 B1 | 9/2001 | Bickers et al. | 360/48 |
| 6,339,810 B1 * | 1/2002 | Basham et al. | 711/111 |
| 6,343,342 B1 * | 1/2002 | Carlson | 711/112 |
| 6,425,042 B1 * | 7/2002 | Ikeda et al. | 711/4 |
| 6,567,349 B1 * | 5/2003 | Nagata et al. | 369/30.07 |
| 6,675,257 B1 * | 1/2004 | Khalid et al. | 711/111 |
| 6,944,734 B1 * | 9/2005 | Anzai et al. | 711/163 |
| 2004/0006579 A1 * | 1/2004 | Hikita et al. | 707/204 |
| 2004/0168024 A1 * | 8/2004 | Buckingham | 711/111 |

OTHER PUBLICATIONS

Microsoft Tape Format Specification, Sep. 15, 2000, Version 1.00a, Seagate Software, Inc., pp. 13-21.*
Niklaus Wirth, "On Multiprogramming, Machine Coding, and Computer Organization," Sep. 1969, pp. 489-498.

* cited by examiner

Primary Examiner—Reginald G. Bragdon
Assistant Examiner—Shawn Gu
(74) Attorney, Agent, or Firm—Dale F. Regelman

(57) ABSTRACT

A method to write information to an information storage medium. The method creates one or more objects comprising information and provides a first one of those one or more objects. The method writes a header label to an information storage medium, where the header label comprises an object processing indicator. The method assigns a first sequence number to the first object and writes that first object to the information storage medium beginning at a first blockid and ending at a second blockid. The method writes a trailer label to the information storage medium, where that trailer label comprises an embedded object field count. The method writes an object information block to the information storage medium, where that object information block comprises the first sequence number, the first blockid, and the second blockid.

18 Claims, 15 Drawing Sheets

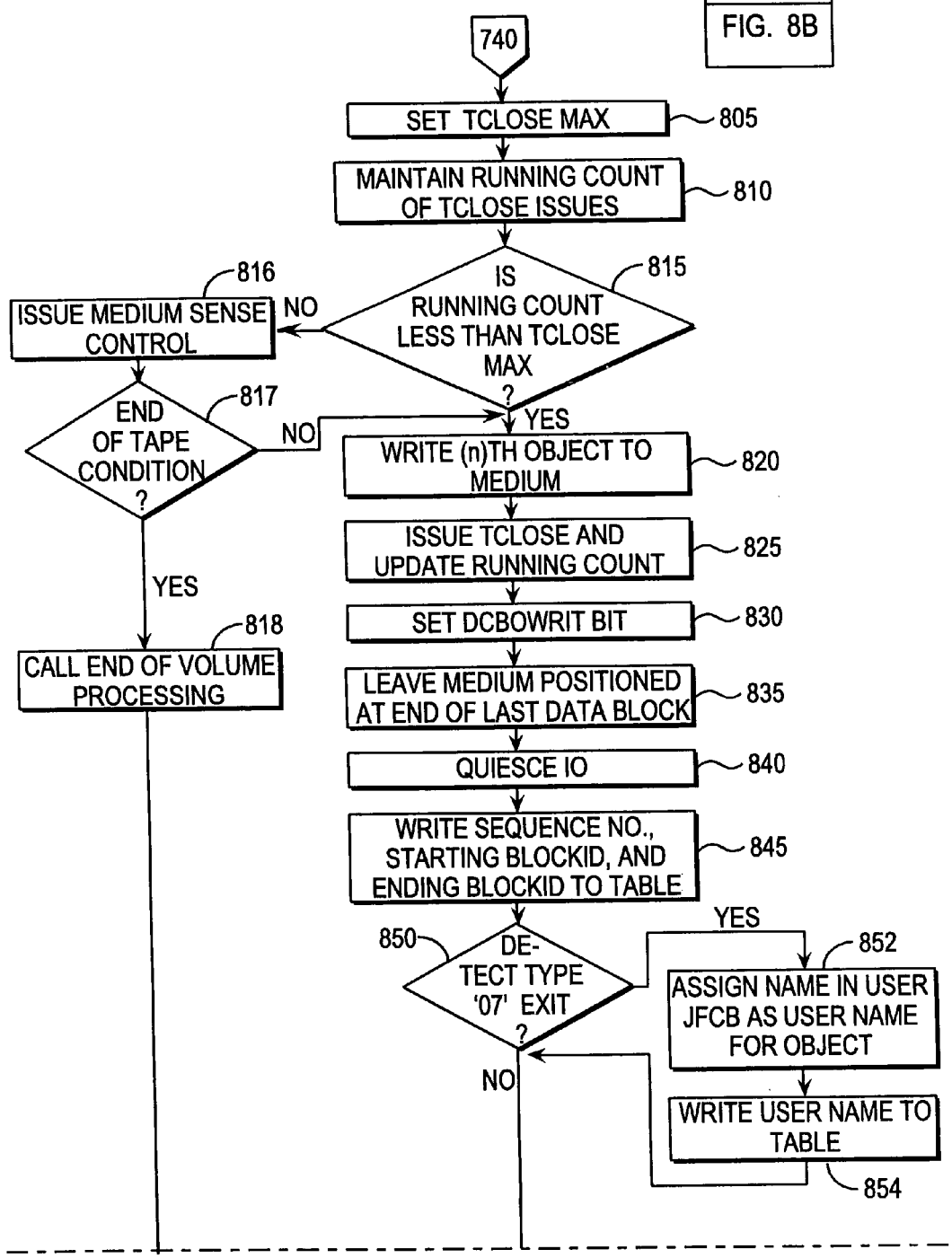

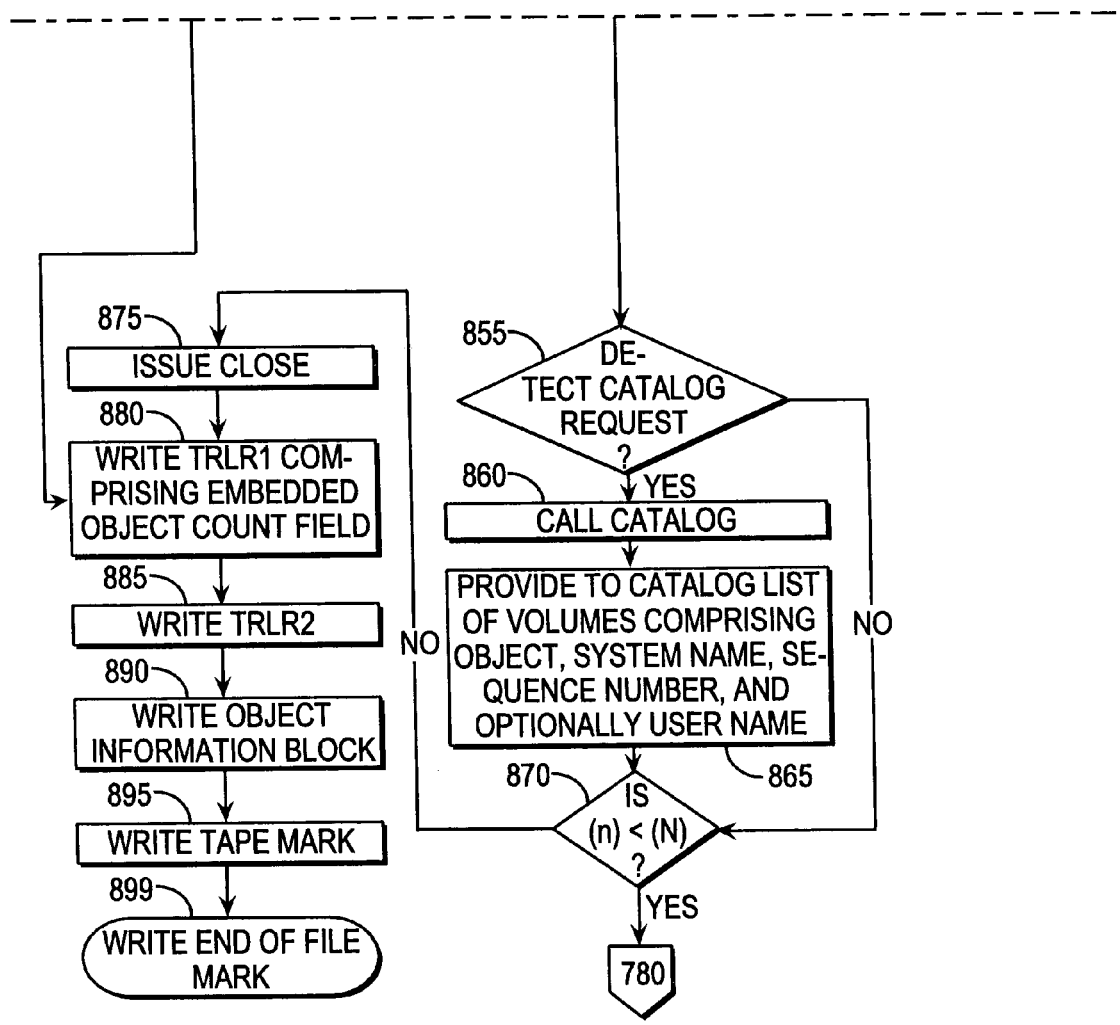

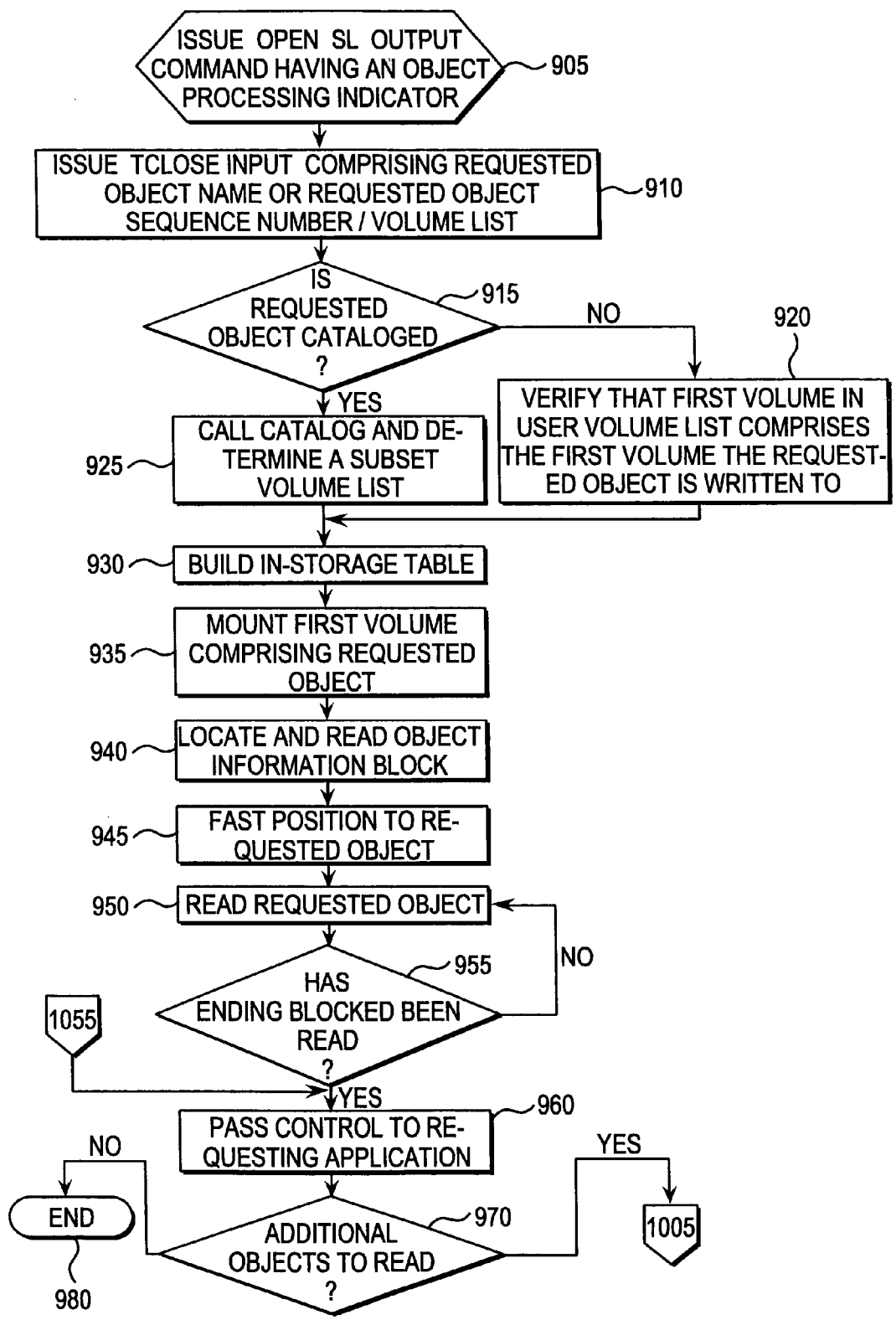

APPARATUS AND METHOD TO WRITE INFORMATION TO AND/OR READ INFORMATION FROM AN INFORMATION STORAGE MEDIUM

FIELD OF THE INVENTION

Applicant's invention relates to a method and apparatus to write information to, and read information from, an information storage medium.

BACKGROUND OF THE INVENTION

Automated media storage libraries are known for providing cost effective access to large quantities of stored media. Generally, media storage libraries include a large number of storage slots in which are stored portable information storage media. The portable information storage media are typically housed in a portable container, such as a tape cartridge, an optical cartridge, and the like. One (or more) accessors typically access the information storage media from the storage slots and deliver the accessed media to an information storage drive for reading and/or writing data on the accessed media. Suitable electronics operate the accessor(s) and operate the data storage drive(s) to transmit to, and/or to receive data from, an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM TotalStorage® 3494 Enterprise Tape Library. What is needed, however, is a method and apparatus and method to expedite the writing of information to an information storage medium, and the subsequent reading of that information from the information storage medium, particularly where the information comprises a plurality of individual files. Applicants' method can be used to read/write information from/to serial storage devices, where those serial storage devices may, or may not, be disposed within in an automated media library.

SUMMARY OF THE INVENTION

Applicants' invention includes an apparatus and method to write information to an information storage medium. The method creates one or more objects comprising information and provides a first one of those one or more objects, where that first object comprises one or more computer files. The method further provides an information storage medium comprising a plurality of blockid addresses, and writes a header label to that information storage medium, where the header label comprises an object processing indicator.

The method then assigns a first sequence number to the first object and writes that first object to the information storage medium beginning at a first blockid and ending at a second blockid. The method then writes a trailer label to the information storage medium, where that trailer label comprises an embedded object field count, and writes an object information block to the information storage medium, where that object information block comprises the first sequence number, the first blockid, and the second blockid.

Applicants' invention further includes an apparatus and a method to read information using an information storage device comprising a read head. The method provides an information storage medium comprising a plurality of blockid addresses, a header label comprising an object processing indicator, a trailer label comprising an embedded object field count, one or more objects comprising information written between the header label and the trailer label, and an object information block comprising a starting blockid and an ending blockid for each of the one or more objects;.

The method receives a request to read a first one of the one or more objects, mounts the information storage medium in the information storage device, and reads the object information block to determine the starting blockid and the ending blockid for the first object. The method then positions the information storage medium such that the read head is disposed adjacent the information storage medium at the starting blockid for the first object, and then reads the first object.

Applicants' invention further includes an article of manufacture comprising a computer useable medium having computer readable program code disposed therein for writing information to an information storage medium using Applicants' method. Applicants' invention further includes an article of manufacture comprising a computer useable medium having computer readable program code disposed therein for reading information from an information storage medium using Applicants' method.

Applicants' invention further includes a computer program product usable with a programmable computer processor having computer readable program code embodied therein for writing information to an information storage medium using Applicants' method. Applicants' invention further includes a computer program product usable with a programmable computer processor having computer readable program code embodied therein for reading information from an information storage medium using Applicants' method.

BRIEF DESCRIPTION OF THE DRAWINGS

The invention will be better understood from a reading of the following detailed description taken in conjunction with the drawings in which like reference designators are used to designate like elements, and in which:

FIG. 8A is a flowchart summarizing the initial steps of a second embodiment of Applicants' method to write information to a data storage tape medium;

FIG. 8B is a flowchart summarizing certain additional steps of the second embodiment of FIG. 8A;

FIG. 9 is a flowchart summarizing the initial steps of Applicants' method to read information from an information storage medium;

DETAILED DESCRIPTION OF THE PREFERRED EMBODIMENTS

Referring to the illustrations, like numerals correspond to like parts depicted in the figures. The invention will be described as embodied in an automated data storage and retrieval subsystem for use in a data processing environment. The following description of Applicant's method to write information to, and read information from, a movable tape medium, or to a movable tape medium disposed within a portable data storage cartridge is not meant, however, to limit Applicant's invention to either data storage and retrieval systems, or to magnetic tape applications, as the invention herein can be applied to information storage in general.

Figure 3:
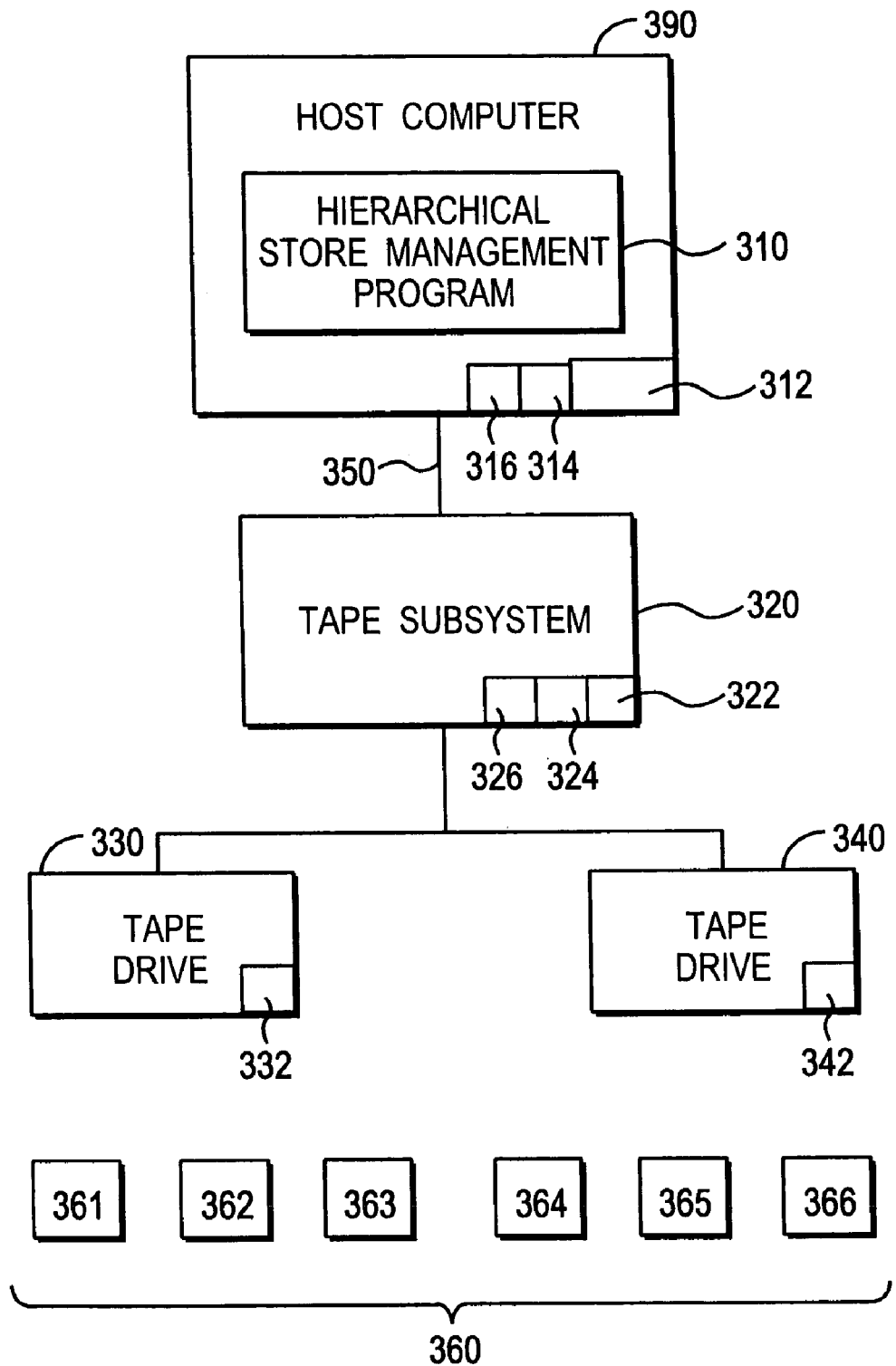
FIG. 3 is block diagram showing the components of Applicants' data storage and retrieval system.

FIG. 3 illustrates the hardware and software environment in which certain embodiments of the present invention are implemented. Host computer 390 includes, among other programs, Applicants' hierarchical storage management (HSM) program 310 and application 312. Host computer 390 comprises one or more mainframe computers, one or more personal computers, and/or combinations thereof.

Information is transferred between the host system 390 and secondary storage devices managed by a data storage and retrieval system, such as tape subsystem 320, via communication link 350. Tape subsystem 320 includes controller 322. Communication link 350 comprises a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In the embodiment shown in FIG. 3, tape subsystem 320 includes tape drives 330 and 340. Tape drive 330 includes device controller 332. Tape drive 340 includes device controller 342. In other embodiments of Applicants' data storage and retrieval system, tape subsystem 320 includes a single data storage drive. In alternative embodiments, Applicants' data storage and retrieval system 320 includes more than two data storage drives.

A plurality of portable information storage media 360 are stored within Applicants' data storage and retrieval system. In certain embodiments, plurality of information storage media 360 are each housed in a portable data storage cartridge. Each of such portable data storage cartridges may be inserted in one of tape drives, and thereafter accessed by the tape subsystem 320. In alternative embodiments, alternative storage media may be substituted for the tape media 360. By "information storage medium," Applicants' mean any type of sequential storage media supporting a sequential access command architecture. By "information storage device," Applicants mean a device capable of writing information to, and/or reading information from, an information storage medium.

The tape subsystem 320 further includes program logic to manage tape drives 330 and 340, and plurality of tape media 360. In alternative embodiments, tape subsystem 330 and host system 390 may be located on a single computer machine.

Host system 390 comprises a computer system, such as a mainframe, personal computer, workstation, etc., including an operating system such as Windows, AIX, Unix, MVS, etc. (Windows is a registered trademark of Microsoft Corporation; AIX is a registered trademark and MVS is a trademark of IBM Corporation; and UNIX is a registered trademark in the United States and other countries licensed exclusively through The Open Group.) The HSM program 310 in the host system 390 may include the functionality of HSM type programs known in the art that manage the transfer of data to a tape library, such as the IBM DFSMS implemented in the IBM MVS operating system.

In certain embodiments, in addition to including known HSM functions, such as recall and migration, the HSM program 310 further includes additional program instructions to perform the operations of the embodiments of the present invention. The HSM program 310 may be implemented within the operating system of the host system 390 or as a separate, installed application program.

The tape subsystem 320 comprises a computer system, and manages a plurality of tape drives and tape cartridges. In certain embodiments, information storage devices 330 and 340 comprise IBM TotalStorage® 3590 tape drives and the portable information storage media comprise magnetic tapes housed in IBM TotalStorage® 3590 tape cartridges. TotalStorage is a registered trademark of the IBM corporation.

The tape subsystem 320 may be a manual tape library in which the user must manually mount tape cartridges 370 into the tape drives 330/340, or an automated tape library (ATL) in which a robotic arm mounts tape cartridges 370 in the library into the tape drives 330/340.

Figure 1:
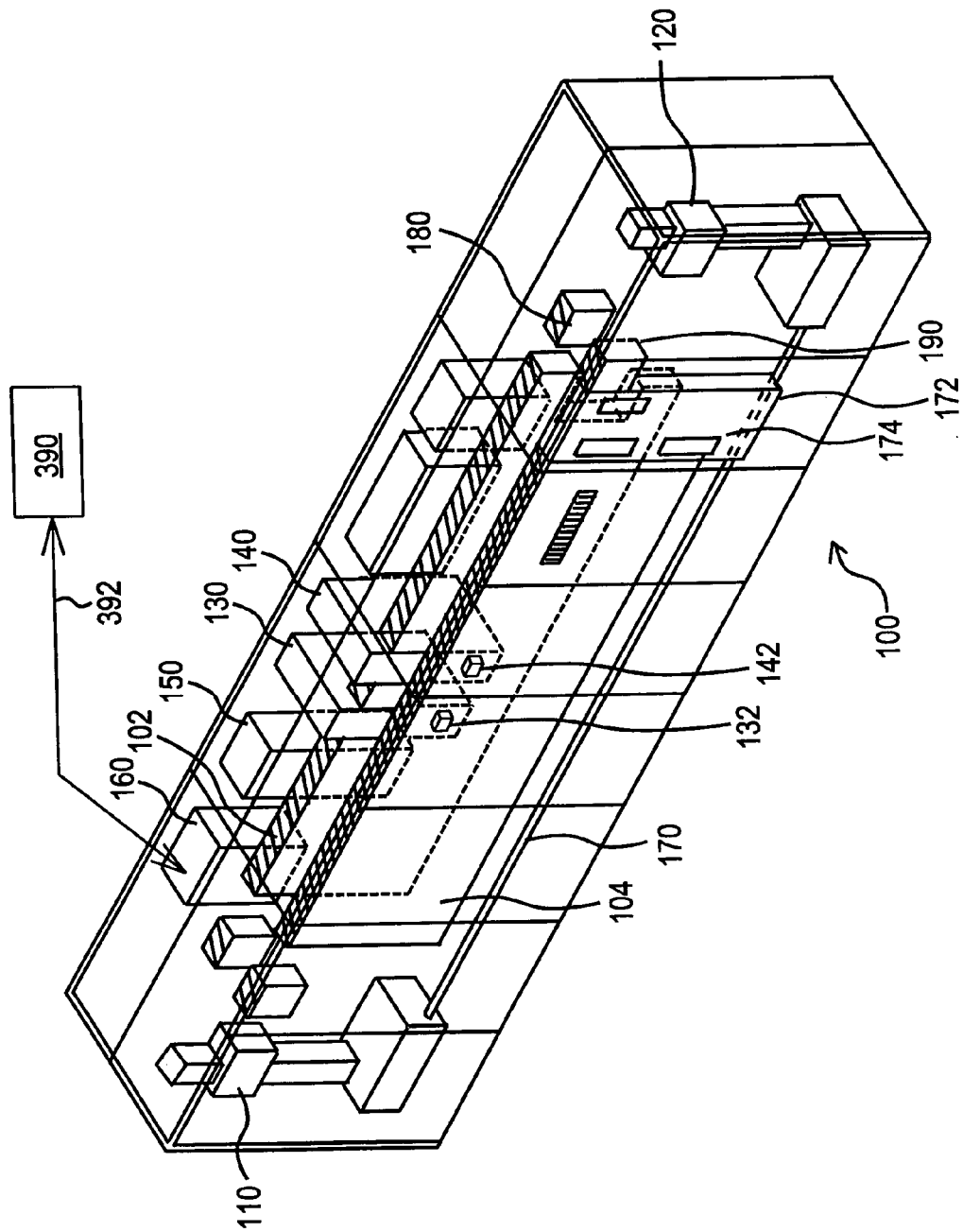
FIG. 1 is a perspective view of a first embodiment of Applicants' data storage and retrieval system.

For example referring now to FIG. 1, automated data storage and retrieval system 100 is shown having a first wall of storage slots 102 and a second wall of storage slots 104. Portable data storage cartridges, such as tape cartridges 370, are individually stored in these storage slots.

Data storage and retrieval system 100 includes one or more accessors, such as accessors 110 and 120. An accessor is a robotic device which accesses portable data storage media from first storage wall 102 or second storage wall 104, delivers that accessed media to information storage devices 130/140 for reading and/or writing data thereon, and returns the media to the proper storage slot.

Library controller 160 (FIG. 1) communicates with host computer 390 (FIGS. 1, 3) via communication link 392. In certain embodiments, library controller 160 is integral with host 390. In other embodiments, controller 160 is external to host 390. Operator input station 150 permits a user to communicate with Applicant's automated data storage and retrieval system 100. Devices 180 and 190 each comprise information buffers. In certain embodiments, devices 180 and/or 190 comprise a Direct Access Storage Device ("DASD") cache. In certain embodiments DASD cache 180 and 190 comprise a plurality of hard disk drives which are configured into one or more RAID arrays.

In certain embodiments, information transferred between host computer 390 and data storage and retrieval system 100 is buffered in DASD caches 180 and 190 before being recorded on other data storage media, such as one or more magnetic tapes. Import/export station 172 includes access door 174 pivotably attached to the side of system 100. Portable data storage cartridges can be placed in the system, or in the alternative, removed from the system, via station 172/access door 174.

Figure 2:
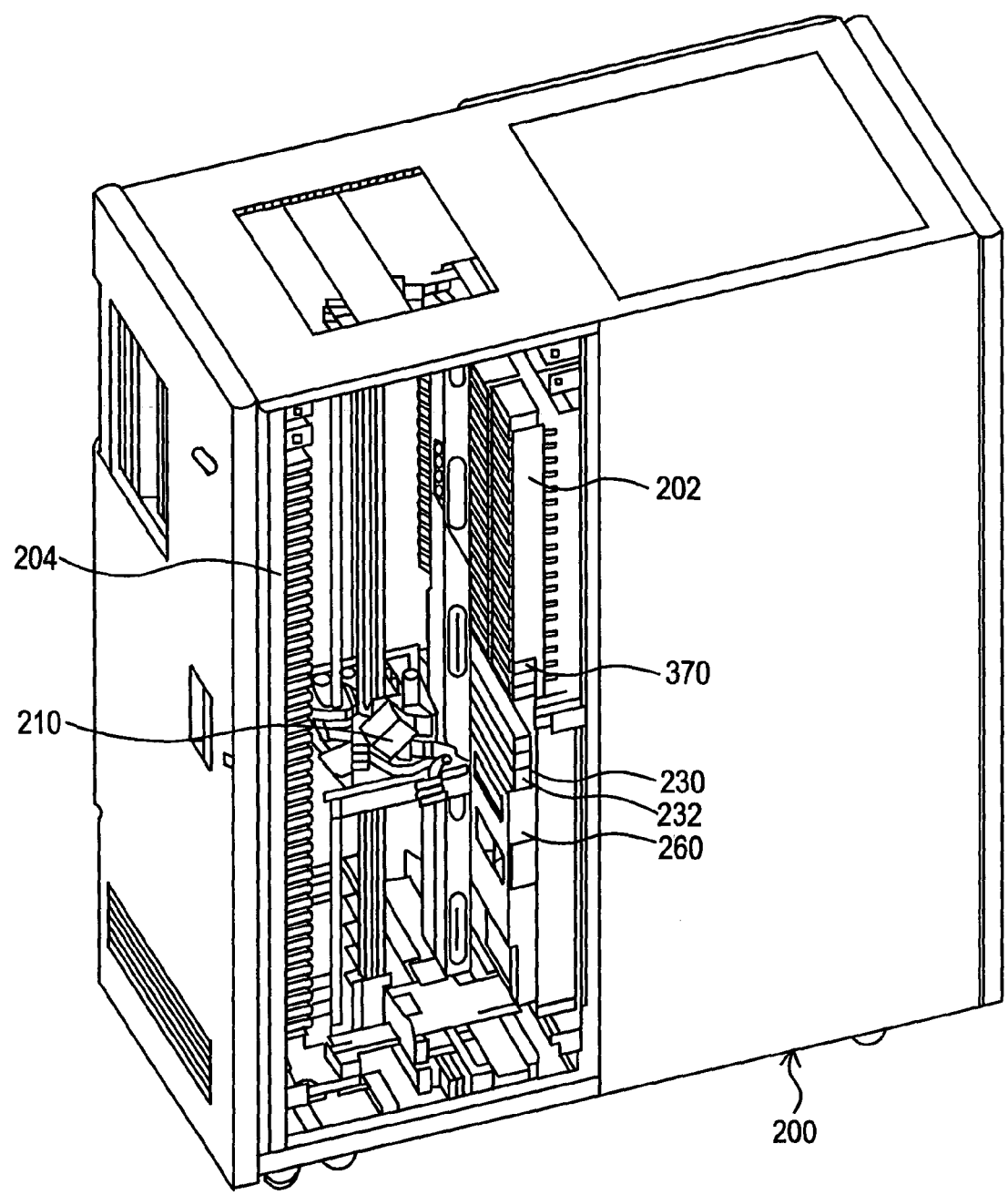
FIG. 2 is a perspective view of a second embodiment of Applicants' data storage and retrieval system.

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of portable data storage cartridges. System 200 includes one or more information storage devices, such as device 230. Device 230 comprises a floppy disk drive, an optical disk drive, a magnetic tape drive, and the like. Device 230 comprises a device controller 232.

System 200 further includes library controller 260. Library controller 260 controls the operation of assessor 210 and, optionally, information storage device 230. System 200 further includes one or a plurality of portable data storage cartridges, such as tape cartridges 370. Each cartridge contains a data storage media internally disposed therein, such as data storage media 360 (FIG. 3).

Referring again to FIG. 3, tape subsystem 320, such as data storage and retrieval system 100/200, receives commands from the HSM program 310 in the host system 390 and performs the operations requested by the HSM program 310, such as migration and recall, to transfer data between the host system 390 and the components managed by the tape subsystem 320. In preferred embodiments, the tape subsystem 320 can simultaneously process numerous input/output requests from the host system 390 and any other attached system directed toward the tape drives 330/340 and tape cartridges 370 managed by the tape subsystem 320. Moreover, in certain embodiments HSM program 310 in the host system 390 is capable of multi-tasking, simultaneously executing numerous input/output operations, and simultaneously transmitting multiple I/O requests to the tape subsystem 320 to execute.

In further embodiments, a plurality of host systems 390 may communicate with the tape subsystem 320 and/or a host system 390 may communicate and transfer data to a plurality of tape subsystems 320, each subsystem providing access to a library of tape cartridges.

Figure 4:
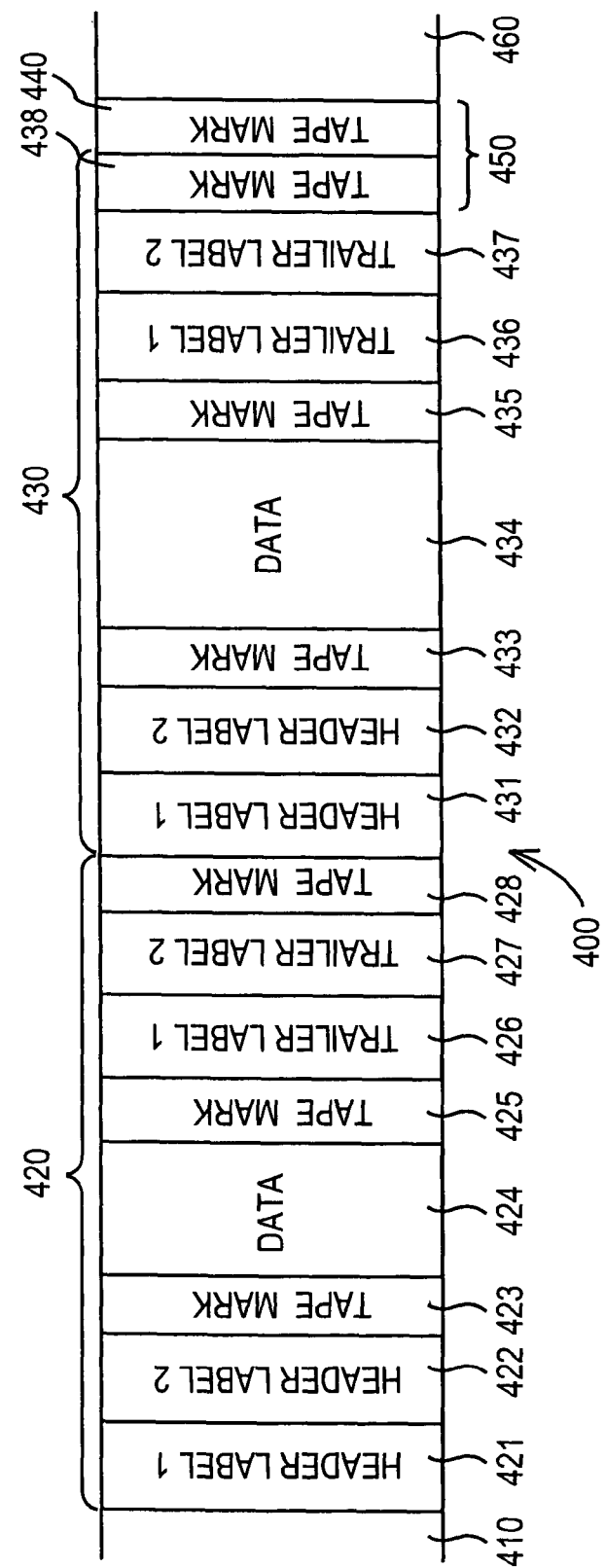
FIG. 4 is a block diagram showing a prior art image of the standard label format of an information storage medium.

FIG. 4 is a block diagram depicting a prior art image of information stored on an information storage medium, such as a portion of magnetic tape 400. The information written on tape 400 includes file 420 and file 430. File 420 is the (N)th file stored on tape 400 and file 430 is the (N+1)th file stored on tape 500. Files 1 through (N−1) are stored on portion 410 of tape 500. No data is written to portion 460 of tape 400.

File 420 includes header label1 421, header label2 422, tape mark 423, data 424, tape mark 425, trailer label1 426, trailer label2 427, and tape mark 428. File 430 includes header label1 431, header label2 432, tape mark 433, data 434, tape mark 4325, trailer label1 436, trailer label2 437, and tape mark 438.

Tape mark 440 is disposed after tape mark 438. Tape mark 438 in combination with tape mark 440 comprises double tape mark 450. Double tape mark 450 signifies that file 430 is the last file written on tape 400. Thus, portion 460 of tape 400 contains no information.

Figure 5A:
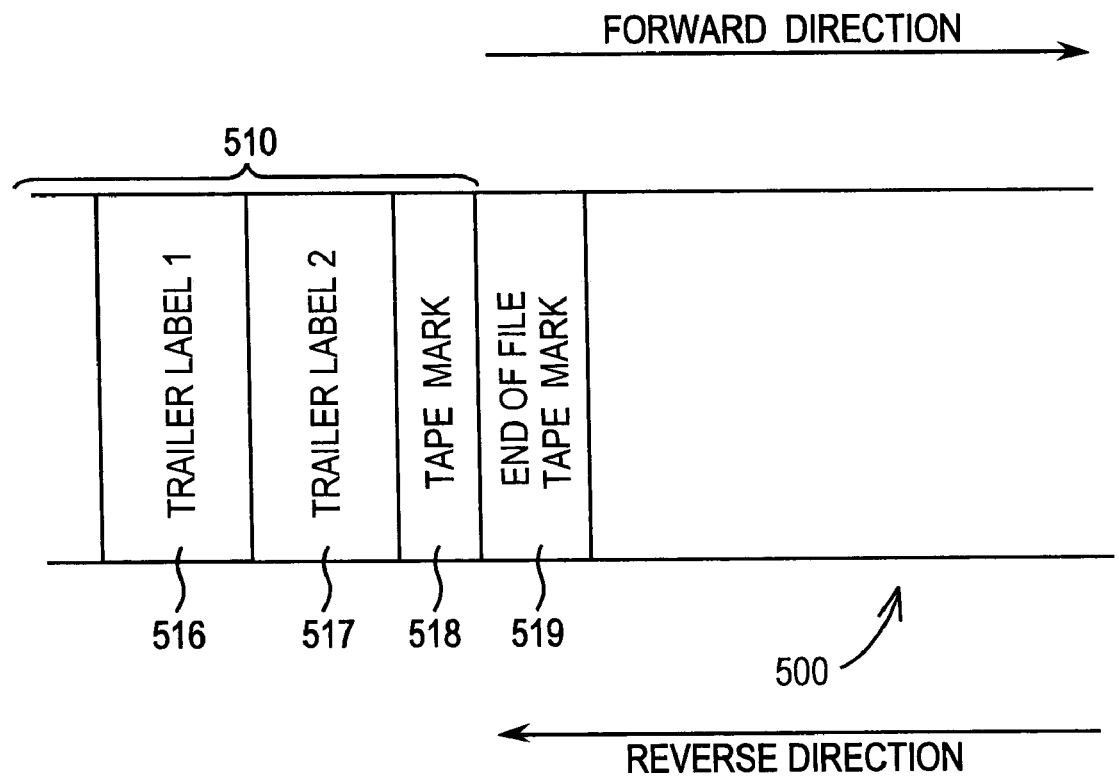
FIG. 5A is a block diagram showing a portion of the last file written to a tape storage medium.

FIGS. 5A–5E illustrate prior art methods to write information to tape 500. Referring to FIG. 5A, tape 500 includes (N−1) files. The (N−1)th file ends with trailer label group 516/517 followed by tape mark 518 and end of file tape mark 519. The double tape mark 518/519 identifies the end of information stored on tape 500.

An attached host computer, such as host computer 390 (FIGS. 1, 3), instructs a information storage device, such as information storage device 130 (FIG. 1), to write new information on a designated information storage medium, such as tape 500. A robotic accessor, such as accessor 110 (FIG. 1), retrieves and transports the portable data storage cartridge housing tape 500. That portable data storage cartridge is inserted, i.e. mounted, in information storage device 130.

Figure 5B:
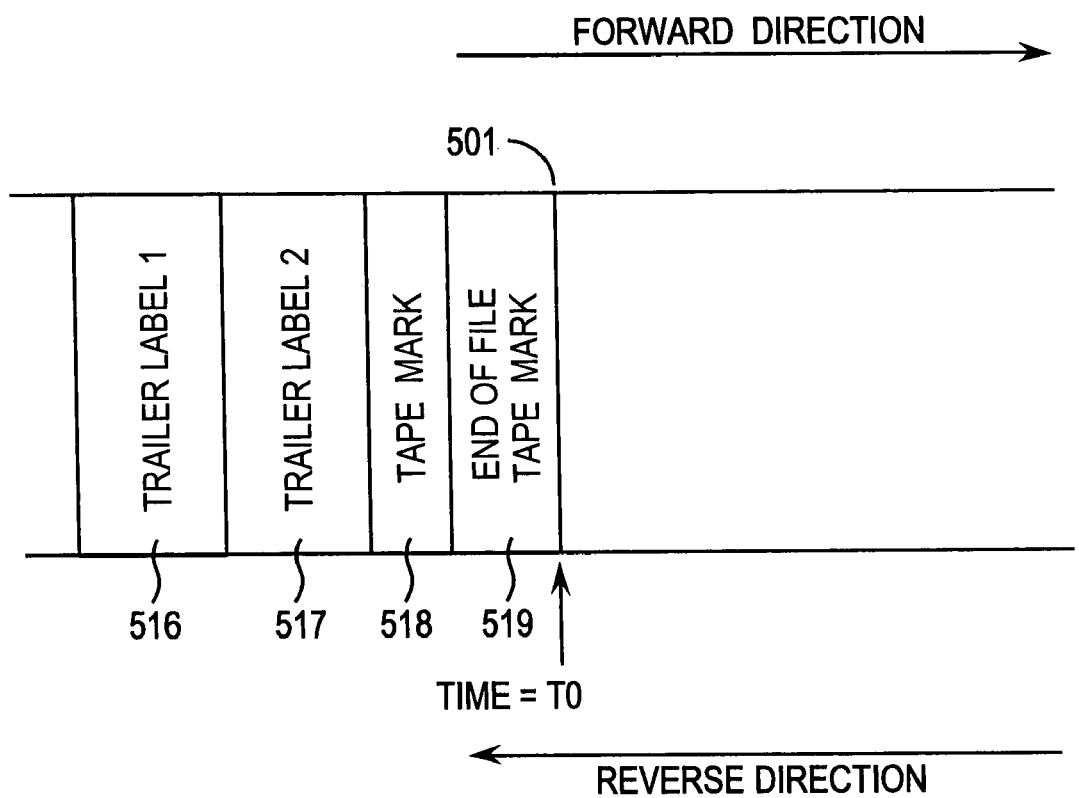
FIG. 5B is a block diagram showing certain initial steps of a prior art method to write information to the tape medium of FIG. 5A.
Figure 5C:
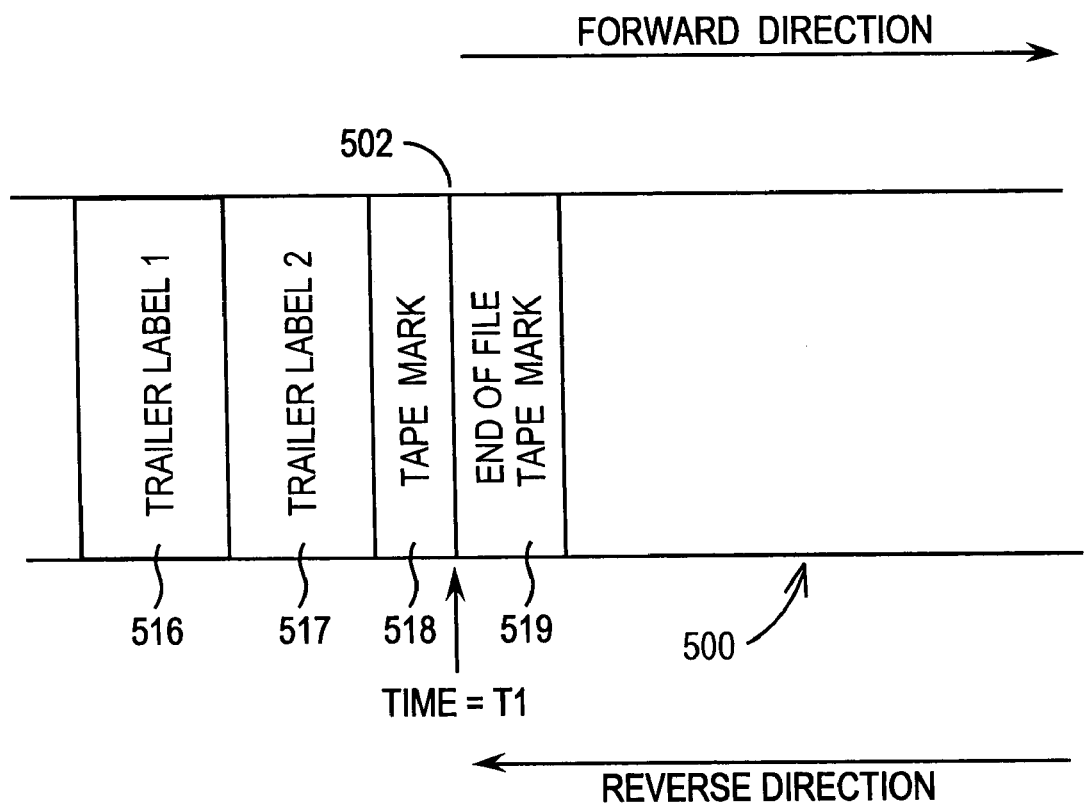
FIG. 5C is a block diagram showing certain additional steps of the prior art method of FIG. 5B.

Information storage device 130 advances tape 500 in either the forward or the reverse direction as needed until double tape mark 518/519 is found. As those skilled in the art will appreciate, information storage device 130 includes a read/write head internally disposed therein. Referring now to FIG. 5B, upon locating double tape mark 518/519 the movement of tape 500 is stopped such that the read/write head is positioned at location 501 recited in FIG. 5B at time $T_0$. Thereafter, a Back Space File command ("BSF") command is issued to tape drive 130 and tape 500 is moved in the reverse direction to position the read/write head between tape mark 518 and tape mark 519, i.e. to position 502 shown on FIG. 5C at time $T_1$.

Figure 5D:
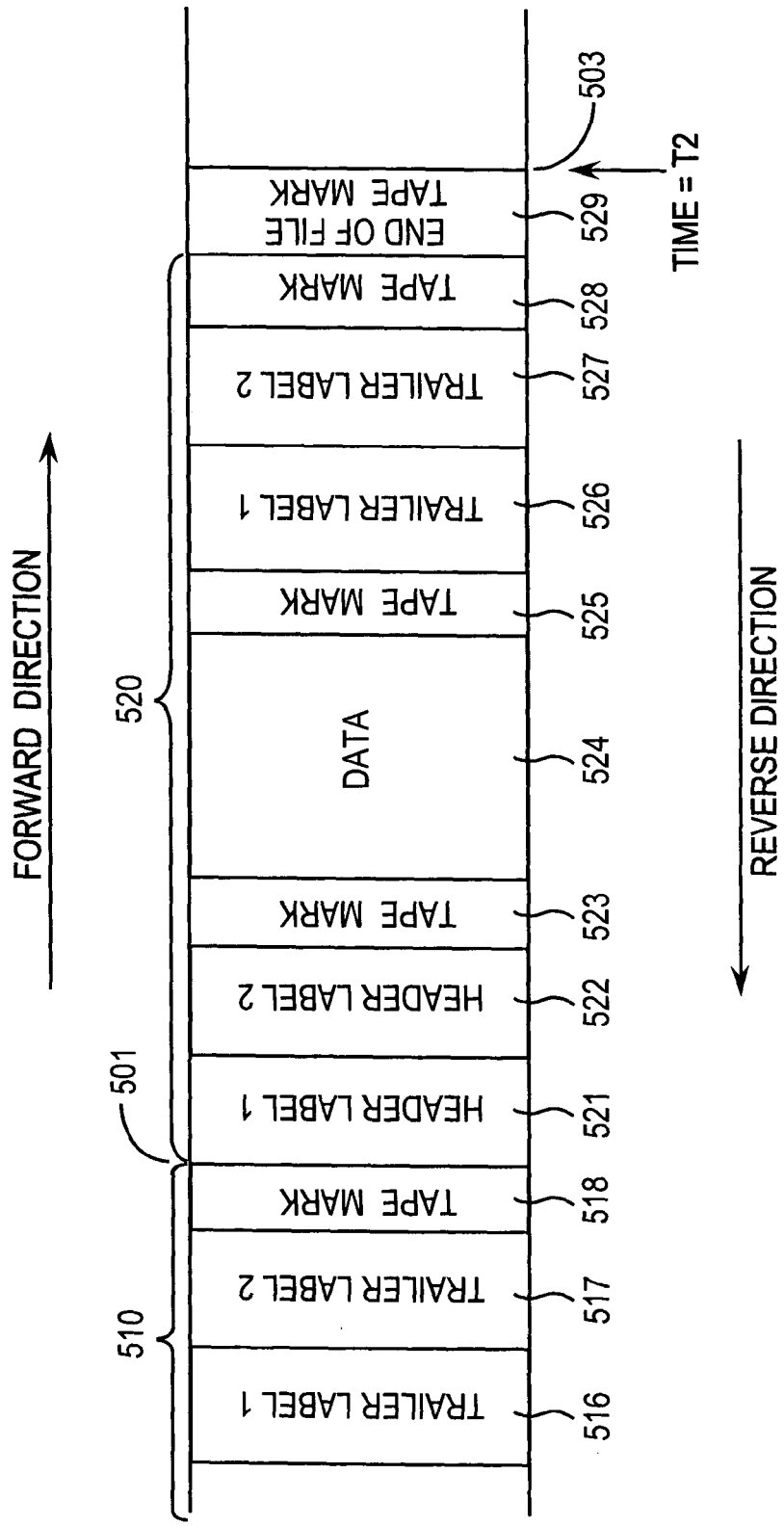
FIG. 5D is a block diagram showing certain additional steps of the prior art method of FIG. 5B.

Referring now to FIG. 5D, header label 1 521 is written to tape 500 starting at position 501. After header label 1 521 is written to tape 500, header label 2 522 is written to tape 500 adjacent header label 1 521. Thereafter, tape mark 523 is written adjacent header label 2 522, data 524 is written adjacent tape mark 523, tape mark 525 is written adjacent data 524, trailer label 1 526 is written adjacent tape mark 525, trailer label 2 527 is written adjacent trailer label 1 526, tape mark 528 is written adjacent trailer label 2 527, and end of file tape mark 529 is written adjacent tape mark 528.

After writing end of file tape mark 529, the read/write head is positioned at location 503 at time T2. Those skilled in the art will appreciate that the time period between $T_1$ and $T_2$, $\Delta T_{Information\ Write}$, represents the time required to write file 520 to tape 500.

Figure 5E:
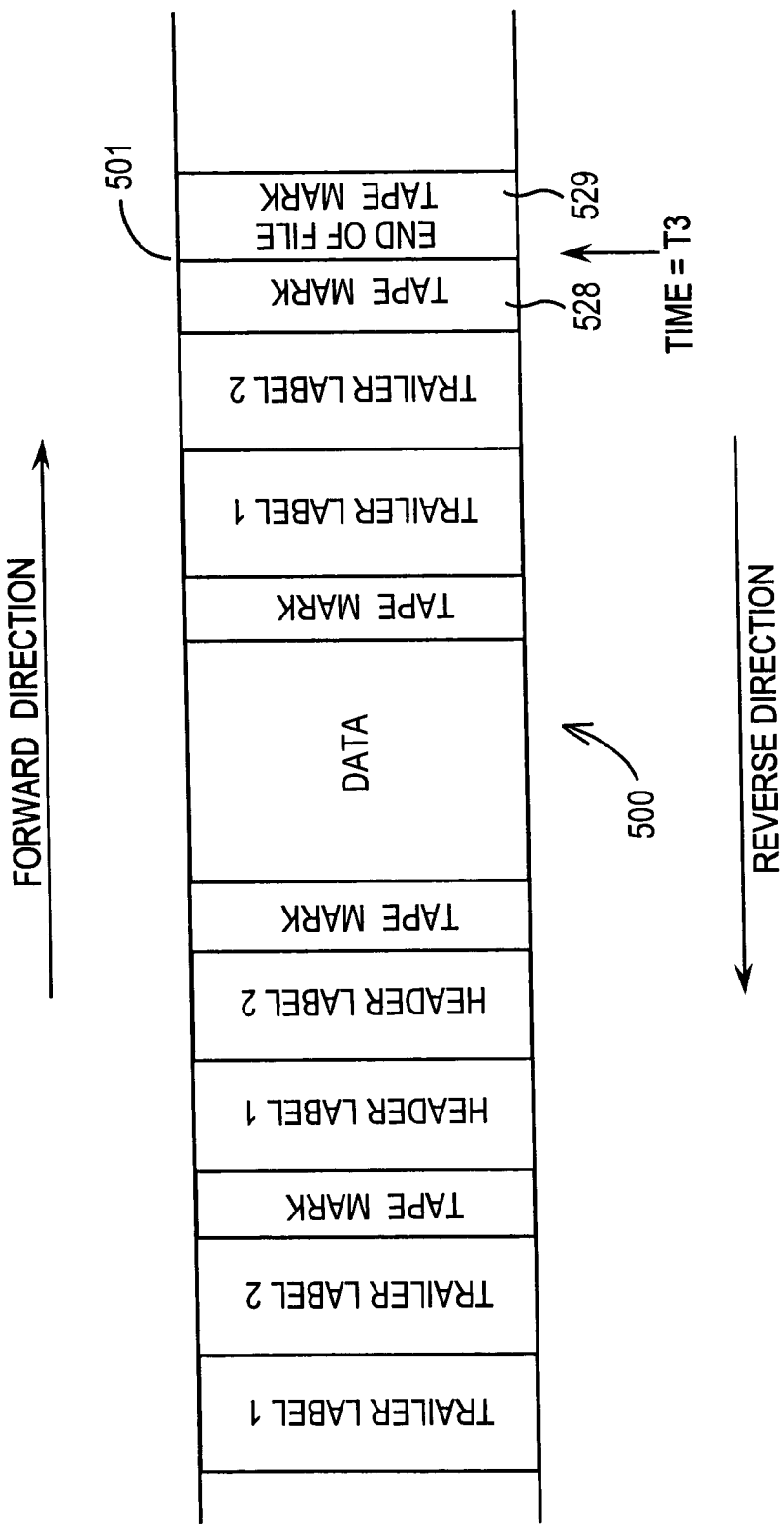
FIG. 5E is a block diagram showing certain additional steps of the prior art method of FIG. 5B.

Referring to FIG. 5E, to write a another file to tape 500, prior art methods issue a Back Space File command which causes tape 500 to move in the reverse direction such that the read/write head is positioned between tape marks 528 and 529, i.e. tape 500 is moved such that the read/write head is positioned at location 504 at time $T_3$. Those skilled in the art will appreciate that the time interval between time $T_2$ and time $T_3$, i.e. $\Delta T_{Head\ Reposition}$, represents the time required to reposition tape 500 such that the read/write head is position at location 504.

Using this prior art method, the time interval $\Delta T_{Prior\ Art}$ required to write file 520 to tape 500 and to reposition the tape to write a subsequent file comprises both $\Delta T_{Information\ Write}$ and $\Delta T_{Head\ Reposition}$. Those skilled in the art will appreciate that writing (N) files using this prior art method necessarily requires Total $Time_{Prior\ Art}$ which equals:

$$\text{Total Time}_{Prior\ Art} = \sum_{i=1}^{N} \Delta Ti_{Information\ Write} + \sum_{i=1}^{N} \Delta Ti_{Head\ Reposition}$$

Needless to say, as (N) increases, the aggregate time required to write (N) double tape marks, issue (N) Back Space File commands, and to move the tape backwards (N) times, also increases. In marked contrast, however, Applicants' method eliminates the need to reverse the movement of the tape (N) times and eliminates the need to write a double tape mark (N) times. Using Applicants' method (N) files can be written to a tape storage medium while moving that tape medium in one direction only, i.e. moving tape 500 in the forward direction but not in the reverse direction.

Figure 6:
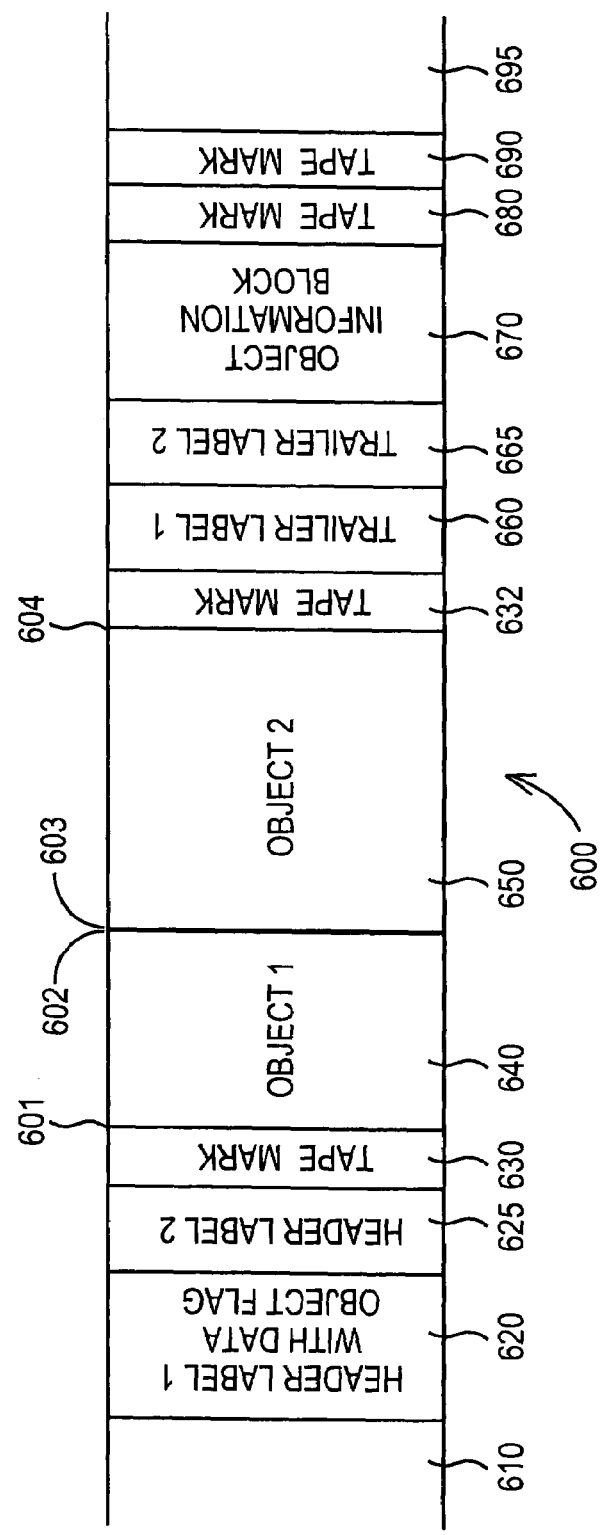
FIG. 6 is a block diagram showing the image of information written to an information storage medium using Applicants' method.

FIG. 6 is a block diagram showing an image of the tape format produced using Applicants' method. Applicants' method utilizes a standard labeling format wherein a double tape mark indicates the end of file. Applicants' format includes a header label 1, such as header label1 620 and a header label 2, such as header label2 625, written adjacent header label1. Tape mark 630 is written adjacent header label2 625.

Using Applicants' method, however, a first data object, such as object 640, is written adjacent tape mark 630. In certain embodiments, object 640 comprises a single data file, such as file 510 (FIG. 5D). In certain embodiments, object 640 comprises a plurality of individual data files. Information storage medium 600 comprises (M) blockid addresses, where those (M) blockid addresses run in sequence from 1 to (M). Object 640 is written to medium 600 beginning at blockid 601 and ending at blockid 602.

In the illustrated embodiment of FIG. 6, data objects 640 and 650 are sequentially written to information storage medium 600. Object 650 is written to information storage medium 600 beginning at blockid 603 and ending at blockid 604. By "sequentially written," Applicants mean that object 650 is written adjacent object 640 such that blockid 602 comprises the (m)th blockid and such that blockid 603 comprises the next, or (m+1)th, blockid.

In certain embodiments, object 650 comprises a single data file, such as file 520 (FIG. 5D). In certain embodiments, object 650 comprises a plurality of individual data files. In the embodiment wherein object 640 comprises a single file such as file 510 and wherein object 650 comprises a single file such as file 520, file 520 is written adjacent to and sequentially with file 510. Thus, in this embodiment files 510 and 520 are written to tape 500 without stopping the tape, without issuing a Back Space File command, and without moving tape 500 in the reverse direction.

In the illustrated embodiment of FIG. 6, tape mark 632 is written adjacent second data object 650. In other embodiments of Applicants' method, a single data object is written between tape marks 630 and 632. In still other embodiments, (N) data objects are sequentially written between tape marks 630 and 632, wherein (N) is greater than 2.

Trailer label1 660 is written adjacent tape mark 632. Trailer label1 660 includes an embedded object field count. In the illustrated embodiment of FIG. 6, that embedded object field count is set to 2. Trailer label2 665 is written adjacent trailer label1 660. Object information block 670 is written adjacent trailer label2 665. Tape mark 680 is written adjacent object information block 670. Tape mark 690 is written adjacent tape mark 680. Tape marks 680 and 690 comprises a double tape mark, i.e. an end of file mark.

Figure 7:
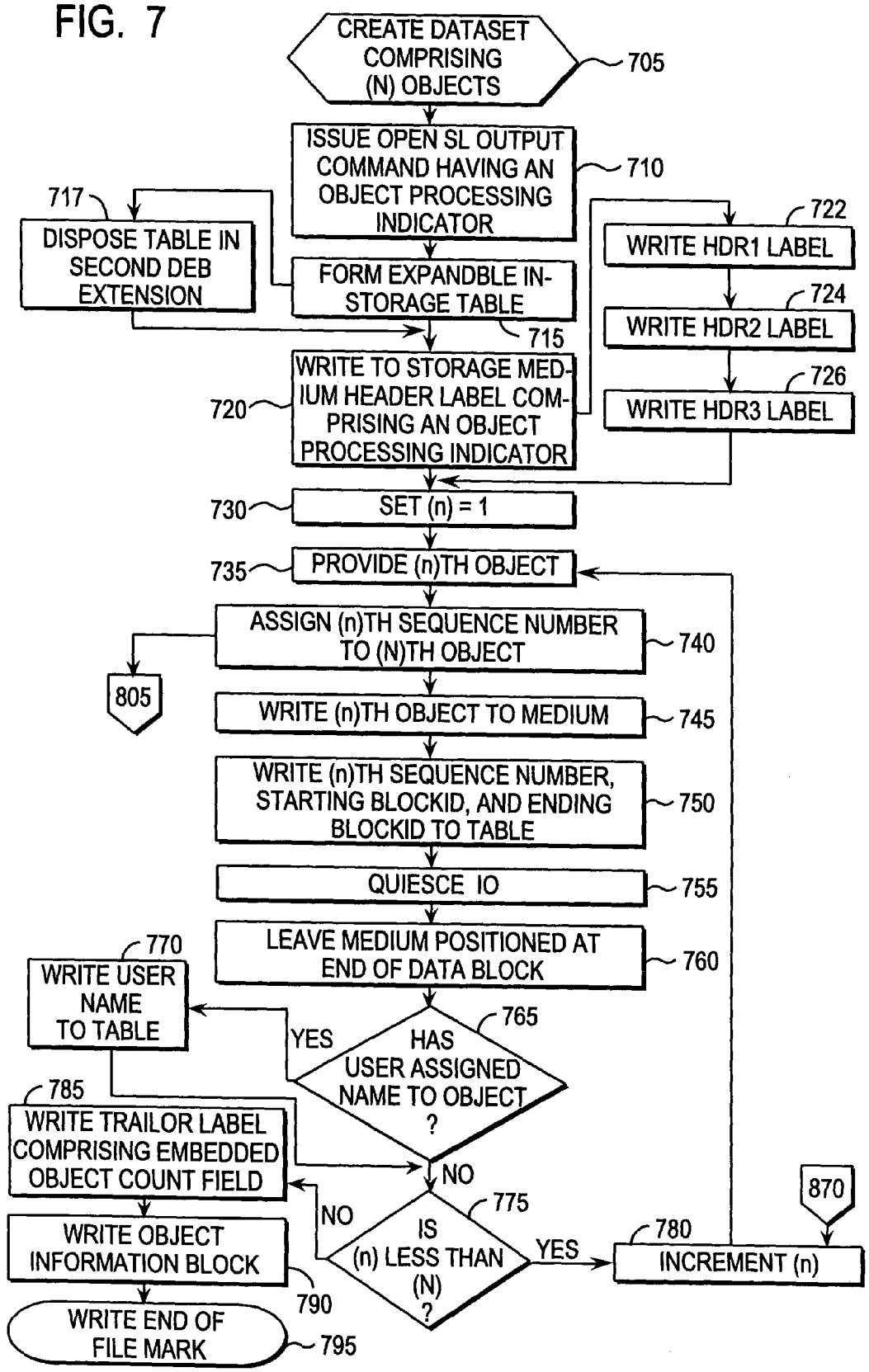
FIG. 7 is a flowchart summarizing one embodiment of Applicants' method to write information to a data storage tape medium.

FIG. 7 summarizes Applicants' method to write information to an information storage medium using the format of FIG. 6. Referring now to FIG. 7, in step 705 Applicants' method creates one or more datasets, wherein each of those one or more datasets comprises one or more data objects. In certain embodiments, step 705 is performed by one or more host computers, such as host computer 390 (FIGS. 1, 3).

In step 710, Applicants' method issues on OPEN SL OUTPUT command, where that command includes an Object Processing Indicator. In certain embodiments, step 710 is performed by a host computer, such as host computer 390, using a hierarchical storage management Program, such as HSM 310. In certain embodiments, step 710 is performed by an application running on a host computer, such as application 312. In certain embodiments, such an application includes an application programming interface which includes an Object Processing Indicator.

In certain embodiments, such an Object Processing Indicator comprises a flag which can be turned "on" or "off." In certain embodiments, such as Object Processing Indicator comprises a bit which can be set to indicate object processing.

In step 715, Applicants' method forms an expandable in-storage table. In certain embodiments, step 715 is performed by a host computer, such as host computer 390 (FIGS. 1, 3). In certain embodiments, step 715 is performed by a controller disposed in Applicants' data storage and retrieval system, such as controller 160 (FIG. 1)/260 (FIG. 2)/322 (FIG. 3). In certain embodiments, such a library controller comprises a computer useable medium, such as computer useable medium 324 (FIG. 3), having computer readable program code disposed therein, where that computer program code comprises a series of computer readable steps comprising a service sometimes referred to as the OPEN service.

In certain embodiments, Applicants' method transitions from step 715 to step 720. In certain embodiments, Applicants' method transitions from step 715 to step 717 wherein the in-storage table of step 715 is anchored in a second Data Extend Block extension. In certain embodiments, step 717 is performed by a host computer, such as host computer 390 (FIGS. 1, 3). In certain embodiments, step 717 is performed by a controller disposed in Applicants' data storage and retrieval system, such as controller 160 (FIG. 1)/260 (FIG. 2)/322 (FIG. 3). In certain embodiments, step 717 is performed by the OPEN service. Applicants' method transitions from step 717 to step 720.

In step 720, Applicants' method writes a header label1 to the information storage medium, where that header label1 includes an Object Processing Indicator. Step 720 is performed by a information storage device, such as information storage device 130 (FIG. 1)/140 (FIG. 1)/230 (FIG. 2)/330 (FIG. 3)/340 (FIG. 3). In certain embodiments, operation of the information storage device in step 720 is controlled by a host computer, such as host computer 390 (FIGS. 1, 3). In certain embodiments, operation of the information storage device in step 720 is controlled by a library controller, such as controller 160 (FIG. 1)/260 (FIG. 2)/322 (FIG. 3)/322 (FIG. 3). In certain embodiments, operation of the information storage device in step 720 in step 785 is controlled by the OPEN program. In certain embodiments, operation of the information storage device in step 720 is controlled by a device controller, such as device controller 132 (FIG. 1)/142 (FIG. 1)/232 (FIG. 2)/332 (FIG. 3)/342 (FIG. 3). In certain embodiments, the information storage device in step 720 is operated by both a library controller and a device controller.

In certain embodiments, Applicants' method transitions from step 720 to step 730. In certain embodiments, Applicants' method transition from step 720 to step 722 wherein the method writes a header label1, such as header label1 660 (FIG. 6) to an information storage medium, such as tape medium 600 (FIG. 6). Applicants' method transitions from step 722 to step 724 wherein the method writes a header label2, such as header label2 625 (FIG. 6), adjacent the header label1. Applicants' method transitions from step 724 to step 726 wherein the method writes a file mark, such as tape mark 630 (FIG. 6), adjacent the header label2.

Steps 722, 724, and 726, are performed by a information storage device, such as information storage device 130 (FIG. 1)/140 (FIG. 1)/230 (FIG. 2)/330 (FIG. 3)/340 (FIG. 3). In certain embodiments, operation of the information storage device in these steps is controlled by a host computer, such as host computer 390 (FIGS. 1, 3). In certain embodiments, operation of the information storage device in these steps is controlled by a library controller, such as controller 160 (FIG. 1)/260 (FIG. 2)/322 (FIG. 3). In certain embodiments, operation of the information storage device in these steps is controlled by the OPEN program. In certain embodiments, operation of the information storage device in these steps is controlled by a device controller, such as device controller 132 (FIG. 1)/142 (FIG. 1)/232 (FIG. 2)/332 (FIG. 3)/342 (FIG. 3). In certain embodiments, the information storage device is operated in these steps by both a library controller and a device controller.

Applicants' method transitions from step 726 to step 730. In steps 730 and 735, Applicants' method provides to the data storage and retrieval system a first one of the (N) objects of step 705, i.e. sets (n) to 1 in step 730 and provides that first object in step 735. In certain embodiments, step 730 is performed by a host computer, such as host computer 390 (FIGS. 1, 3). In certain embodiments, step 730 is performed by the host computer application which created the dataset in step 705. In certain embodiments, step 735 is performed by a host computer, such as host computer 390 (FIGS. 1, 3). In certain embodiments, step 735 is performed by the host computer application which created the dataset in step 705.

Applicants' method transitions from step 735 to step 740 wherein the method assigns a sequence number to the (n)th object. In certain embodiments, step 740 is performed by a host computer, such as host computer 390 (FIGS. 1, 3). In certain embodiments, step 740 is performed by a controller disposed in a data storage and retrieval system, such as controller 160 (FIG. 1)/260 (FIG. 2)/322 (FIG. 3). In certain embodiments, step 740 is performed by the OPEN program.

Applicants' method transitions from step 740 to step 745 wherein the method writes the (n)th object to the information storage medium. Step 745 is performed by a information storage device, such as information storage device 130 (FIG. 1)/230 (FIG. 2). In certain embodiments, operation of the information storage device in step 745 is controlled by a host computer, such as host computer 390 (FIGS. 1, 3). In certain embodiments, operation of the information storage device in step 745 is controlled by a library controller, such as controller 160 (FIG. 1)/260 (FIG. 2)/322 (FIG. 3). In certain embodiments, operation of the information storage device in step 745 is controlled by the OPEN program. In certain embodiments, operation of the information storage device in step 745 is controlled by a device controller, such as device controller 132 (FIG. 1)/142 (FIG. 1)/232 (FIG. 2)/332 (FIG. 3)/342 (FIG. 3). In certain embodiments, the information storage device in step 745 is operated by both a library controller and a device controller.

In certain embodiments, following execution of step 745 control is passed from the OPEN program to the application on the host computer which created the (n)th object. Thereafter, that host computer application calls a software routine comprising a computer readable program code, where that computer program code includes a series of computer readable steps comprising a service sometimes referred to as the TCLOSE service.

Applicants' method transitions from step 745 to step 750 wherein the method writes the (n)th sequence number, the starting blockid number for the (n)th object, and the ending blockid for the (n)th object, and the identifier for the first volume the object resides on, to the table of step 715.

In certain embodiments, step 750 is performed by a host computer, such as host computer 390 (FIGS. 1, 3). In certain embodiments, step 750 is performed by a controller disposed in a data storage and retrieval system, such as controller 160 (FIG. 1)/260 (FIG. 2)/322 (FIG. 3). In certain embodiments, step 750 is performed by the TCLOSE program.

Applicants' method transitions from step 750 to step 755 wherein the method quiesces input/output to/from the data storage and retrieval system. In certain embodiments, step 755 is performed by a host computer, such as host computer 390 (FIGS. 1, 3). In certain embodiments, step 755 is performed by a controller disposed in a data storage and retrieval system, such as controller 160 (FIG. 1)/260 (FIG. 2)/322 (FIG. 3). In certain embodiments, step 755 is performed by the TCLOSE program. Applicants' method transitions from step 755 to step 760 where the method leaves the information storage medium positioned such that the write head is disposed immediately adjacent the last data block written to the medium.

Applicants' method transitions from step 760 to step 765 wherein the method determines if the user assigned a name to the (n)th object. In certain embodiments, step 765 is performed by a host computer, such as host computer 390 (FIGS. 1, 3). In certain embodiments, step 765 is performed by a controller disposed in a data storage and retrieval system, such as controller 160 (FIG. 1)/260 (FIG. 2)/322 (FIG. 3). In certain embodiments, step 765 is performed by the TCLOSE program.

If Applicants' method determines in step 765 that the user has assigned a name to the (n)th object, then the method transitions from step 765 to step 770 wherein the method writes that user name to the table of step 715. Applicants' method transitions from step 770 to step 775. If Applicants' method determines in step 765 that the user has not assigned a name to the (n)th object, then the method transitions from step 765 to step 775 wherein the method determines if each of the (N) objects of step 705 have been written to the information storage medium, i.e. if (n) is less than (N).

If Applicants' method determines in step 775 that not all (N) objects have been written to the information storage medium, i.e. (n) is less than (N), then the method transitions from step 775 to step 780 wherein the method increments (n). In certain embodiments, step 765 is performed by a host computer, such as host computer 390 (FIGS. 1, 3). In certain embodiments, step 765 is performed by a controller disposed in a data storage and retrieval system, such as controller 160 (FIG. 1)/260 (FIG. 2)/322 (FIG. 3). In certain embodiments, step 765 is performed by the TCLOSE program. Applicants' method transitions from step 780 to step 735 and continues.

If Applicants' method determines in step 775 that all (N) objects have been written to the information storage medium, i.e. (n) is not less than (N), then the method transitions from step 775 to step 785 wherein the method writes a trailer label, such as trailer label1 660 (FIG. 6), to the storage medium, wherein that trailer label includes an embedded object count field. In certain embodiments, step 785 includes writing a second trailer label, such as trailer label2 665 (FIG. 6).

Step 785 is performed by a information storage device, such as information storage device 130 (FIG. 1)/140 (FIG. 1)/230 (FIG. 2)/330 (FIG. 3)/340 (FIG. 3). In certain embodiments, operation of the information storage device in step 785 is controlled by a host computer, such as host computer 390 (FIGS. 1, 3). In certain embodiments, operation of the information storage device in step 785 is controlled by a library controller, such as controller 160 (FIG. 1)/260 (FIG. 2)/322 (FIG. 3). In certain embodiments, operation of the information storage device in step 785 is controlled by the TCLOSE program. In certain embodiments, operation of the information storage device in step 785 is controlled by a device controller, such as device controller 132 (FIG. 1)/142 (FIG. 1)/232 (FIG. 2)/332 (FIG. 3)/342 (FIG. 3). In certain embodiments, the information storage device in step 785 is operated by both a library controller and a device controller.

Applicants' method transitions from step 785 to step 790 wherein the method writes an object information block, such as object information block 670 (FIG. 6), to the information storage medium. The object information block of step 790 includes the information written in step 750, and optionally step 770, to the table of step 715. In certain embodiments, the object information block on each volume of a multivolume data set is accumulative, i.e. the object information block written to any one of those multiple volumes includes the identifiers for all previous volumes in addition to the current volume. In certain embodiments, these volume identifiers comprises Volume Serial Numbers sometimes referred to as VOLSERs.

Step 790 is performed by a information storage device, such as information storage device 130 (FIG. 1)/230 (FIG. 2)/330 (FIG. 3)/340 (FIG. 3). In certain embodiments, operation of the information storage device in step 790 is controlled by a host computer, such as host computer 390 (FIGS. 1, 3). In certain embodiments, operation of the information storage device in step 790 is controlled by a library controller, such as controller 160 (FIG. 1)/260 (FIG. 2)/322 (FIG. 3). In certain embodiments, operation of the information storage device in step 790 is controlled by the TCLOSE program. In certain embodiments, operation of the information storage device in step 790 is controlled by a device controller, such as device controller 132 (FIG. 1)/142 (FIG. 1)/232 (FIG. 2)/332 (FIG. 3)/342 (FIG. 3). In certain embodiments, the information storage device is operated in step 790 by both a library controller and a device controller.

Applicants' method transitions from step 790 to step 795 wherein the method writes an end of file mark to the information storage medium. In certain embodiments, the end of file mark of step 795 comprises a double tape mark, such as tape mark 680 (FIG. 6) in combination with tape mark 690 (FIG. 6). Step 795 is performed by a information storage device, such as information storage device 130 (FIG. 1)/230 (FIG. 2). In certain embodiments, operation of the information storage device in step 795 is controlled by a host computer, such as host computer 390 (FIGS. 1, 3). In certain embodiments, operation of the information storage device in step 795 is controlled by a library controller, such as controller 160 (FIG. 1)/260 (FIG. 2)/322 (FIG. 3). In certain embodiments, operation of the information storage device in step 795 is controlled by the TCLOSE program. In certain embodiments, operation of the information storage device in step 795 is controlled by a device controller, such as device controller 132 (FIG. 1)/142 (FIG. 1)/232 (FIG. 2)/332 (FIG. 3)/342 (FIG. 3). In certain embodiments, the information storage device is operated in step 795 by both a library controller and a device controller.

In certain embodiments, Applicants' method transitions from step 740 to step 805. Referring now to FIG. 8, in step 805 Applicants' method sets parameter TCLOSE MAX. In certain embodiments, TCLOSE MAX is set in firmware disposed in a library controller such as controller 160 (FIG. 1)/260 (FIG. 2)/322 (FIG. 3). In certain embodiments, TCLOSE MAX is set by a host computer, such as host computer 390 (FIGS. 1, 3). In certain embodiments, TCLOSE MAX is entered by a user using an operator input station, such as operator input station 150 (FIG. 1). In certain embodiments, TCLOSE MAX is set to about 40. In certain embodiments, TCLOSE MAX is less than about 40. In certain embodiments, TCLOSE MAX is greater than about 40.

In step 810, Applicants' method maintains a running count of TCLOSE issues for the designated information storage medium. In certain embodiments, step 810 is performed by a host computer, such as host computer 390 (FIGS. 1, 3). In certain embodiments, step 810 is performed by a controller disposed in a data storage and retrieval system, such as controller 160 (FIG. 1)/260 (FIG. 2)/322 (FIG. 3). In certain embodiments, step 810 is performed by the OPEN program.

In step 815, Applicants' method determines if the running count of TCLOSE issues of step 810 is less than TCLOSE MAX. In certain embodiments, step 815 is performed by a host computer, such as host computer 390 (FIGS. 1, 3). In certain embodiments, step 815 is performed by a controller disposed in a data storage and retrieval system, such as controller 160 (FIG. 1)/260 (FIG. 2)/322 (FIG. 3). In certain embodiments, step 815 is performed by the OPEN program.

If Applicants' method determines in step 815 that the running count of TCLOSE issues of step 810 is less than TCLOSE MAX, then the method transitions from step 815 to step 820 wherein the method writes the (n)th object to the information storage medium. In certain embodiments, step 820 is performed by a host computer, such as host computer 390 (FIGS. 1, 3). In certain embodiments, step 820 is performed by a controller disposed in a data storage and retrieval system, such as controller 160 (FIG. 1)/260 (FIG. 2)/322 (FIG. 3). In certain embodiments, step 820 is performed by the OPEN program.

If Applicants' method determines in step 815 that the running count of TCLOSE issues of step 810 is not less than TCLOSE MAX, then the method transitions from step 815 to step 816 wherein the method issues a Medium Sense Command. In certain embodiments, step 816 is performed by a host computer, such as host computer 390 (FIGS. 1, 3). In certain embodiments, step 816 is performed by a controller disposed in a data storage and retrieval system, such as controller 160 (FIG. 1)/260 (FIG. 2)/322 (FIG. 3). In certain embodiments, step 816 is performed by the OPEN program.

Applicants' method transitions from step 816 to step 817 wherein the method determines if an End Of Tape Condition exists. Such an End Of Tape Condition could comprise, for example, approaching the physical end of the information storage medium. Alternatively, such an End Of Tape Condition could comprise reaching the logical end of the information storage medium. In certain embodiments, step 817 is performed by a host computer, such as host computer 390

(FIGS. 1, 3). In certain embodiments, step 817 is performed by a controller disposed in a data storage and retrieval system, such as controller 160 (FIG. 1)/260 (FIG. 2)/322 (FIG. 3). In certain embodiments, step 817 is performed by the OPEN program.

If Applicants' method determines in step 817 that an End Of Tape Condition exists, then the method transitions from step 817 to step 818 wherein the method calls an End Of Volume Processing service. In certain embodiments, step 818 is performed by a host computer, such as host computer 390 (FIGS. 1, 3). In certain embodiments, step 818 is performed by a controller disposed in a data storage and retrieval system, such as controller 160 (FIG. 1)/260 (FIG. 2)/322 (FIG. 3). In certain embodiments, step 818 is performed by the OPEN program. Applicants' method transitions from step 818 to step 880 (FIG. 8B).

If Applicants' method determines in step 817 that an End Of Tape Condition does not exist, then the method transitions from step 817 to step 820 wherein the method writes the (n)th object to the information storage medium. Step 820 is performed by a information storage device, such as information storage device 130 (FIG. 1)/140 (FIG. 1)/230 (FIG. 2)/330 (FIG. 3)/340 (FIG. 3). In certain embodiments, operation of the information storage device in step 820 is controlled by a host computer, such as host computer 390 (FIGS. 1, 3). In certain embodiments, operation of the information storage device in step 820 is controlled by a library controller, such as controller 160 (FIG. 1)/260 (FIG. 2)/322 (FIG. 3). In certain embodiments, operation of the information storage device in step 820 is controlled by the OPEN program. In certain embodiments, operation of the information storage device in step 820 is controlled by a device controller, such as device controller 132 (FIG. 1)/142 (FIG. 1)/232 (FIG. 2)/332 (FIG. 3)/342 (FIG. 3). In certain embodiments, the information storage device is operated in step 820 by both a library controller and a device controller.

Applicants' method transitions from step 820 to step 825 wherein the method calls the TCLOSE service and updates the running count of step 810. In certain embodiments, step 825 is performed by a host computer, such as host computer 390 (FIGS. 1, 3). In certain embodiments, step 825 is performed by a controller disposed in a data storage and retrieval system, such as controller 160 (FIG. 1)/260 (FIG. 2)/322 (FIG. 3). In certain embodiments, step 825 is performed by the OPEN program.

Applicants' method transitions from step 825 to step 830 wherein the method sets the DCBOWRIT bit to indicate an output path. The CLOSE service subsequently examines this DCBOWRIT bit, and if that bit is set to indicate an output path, then CLOSE in steps 880 and 885 will write the trailer labels, and in step 890 will write the Object Information Block. In certain embodiments, step 830 is performed by a host computer, such as host computer 390 (FIGS. 1, 3). In certain embodiments, step 830 is performed by a controller disposed in a data storage and retrieval system, such as controller 160 (FIG. 1)/260 (FIG. 2)/322 (FIG. 3). In certain embodiments, step 830 is performed by the TCLOSE program. In step 835, the method leaves the information storage medium positioned such that the write head is disposed immediately adjacent the last data block, i.e. the (n)th object, written to the medium.

Applicants' method transitions from step 835 to step 840 wherein the method quiesces input/output to/from the data storage and retrieval system. In this embodiment, step 840 is performed by the TCLOSE program. Applicants' method transitions from step 840 to step 845 wherein the method writes the (n)th sequence number, the starting blockid number for the (n)th object, and the ending blockid for the (n)th object to the table of step 715 (FIG. 7). In this embodiment, step 845 is performed by the TCLOSE program.

Applicants' method transitions from step 845 to step 850 wherein TCLOSE looks for a type '07' data control block ("DCB") exit comprising a pointer to a user job file control block, sometimes referred to as a "JFCB." If TCLOSE does not detect a type '07' DCB exit comprising a pointer to a user JFCB, then Applicants' method transitions from step 850 to step 855 (FIG. 8B).

If in step 850 TCLOSE detects a type '07' DCB exit comprising a pointer to a user JFCB, then Applicants' method transitions from step 850 to step 852 wherein the method assigns the name in that user JFCB as the user name for the (n)th object. In certain embodiments, step 852 is performed by a host computer, such as host computer 390 (FIGS. 1, 3). In certain embodiments, step 852 is performed by a controller disposed in a data storage and retrieval system, such as controller 160 (FIG. 1)/260 (FIG. 2)/322 (FIG. 3). In certain embodiments, step 852 is performed by the TCLOSE program.

Applicants' method transitions from step 852 to step 854 wherein the method writes the user name assigned in step 852 to the table of step 715 (FIG. 7). In certain embodiments, step 854 is performed by a host computer, such as host computer 390 (FIGS. 1, 3). In certain embodiments, step 854 is performed by a controller disposed in a data storage and retrieval system, such as controller 160 (FIG. 1)/260 (FIG. 2)/322 (FIG. 3). In certain embodiments, step 854 is performed by the TCLOSE program.

Referring now to FIGS. 8A and 8B, Applicants' method transitions from step 854 to step 855 wherein the method determines if a catalog request is detected. In certain embodiments, step 855 is performed by a host computer, such as host computer 390 (FIGS. 1, 3). In certain embodiments, step 855 is performed by a controller disposed in a data storage and retrieval system, such as controller 160 (FIG. 1)/260 (FIG. 2)/322 (FIG. 3). In certain embodiments, step 855 is performed by the TCLOSE program.

If Applicants' method does not detect a catalog request in step 855, then the method transitions from step 855 to step 870. Alternatively, if Applicants' method does detect a catalog request in step 855, then the method transitions from step 855 to step 860 wherein the method calls the catalog. Applicants' method transitions from step 860 to step 865 wherein the method writes to the catalog a list of volumes comprising the (n)th object, the system name assigned to that (n)th object, the sequence number assigned to that (n)th object, and optionally, the user name assigned to that (n)th object. In certain embodiments, step 860 is performed by a host computer, such as host computer 390 (FIGS. 1, 3). In certain embodiments, step 860 is performed by a controller disposed in a data storage and retrieval system, such as controller 160 (FIG. 1)/260 (FIG. 2)/322 (FIG. 3). In certain embodiments, step 860 is performed by the TCLOSE program.

Applicants' method transitions from step 865 to step 870 wherein the method determines if all the (N) objects of step 705 have been written to the information storage medium, i.e. if (n) is less than (N). In certain embodiments, step 870 is performed by a host computer, such as host computer 390 (FIGS. 1, 3). In certain embodiments, step 870 is performed by a controller disposed in a data storage and retrieval system, such as controller 160 (FIG. 1)/260 (FIG. 2)/322 (FIG. 3). In certain embodiments, step 870 is performed by the TCLOSE program.

If Applicants' method determines in step 870 that (n) is less than (N), then the method transitions from step 870 to step 780 (FIG. 7) and continues. Alternatively, if Applicants' method determines in step 870 that (n) is not less than (N), then the method transitions from step 870 to step 875 wherein Applicants' method issues the CLOSE command.

In certain embodiments, step 875 is performed by a host computer, such as host computer 390 (FIGS. 1, 3). The host computer application need not issue the CLOSE command. In the event the host computer application does not provide an object in step 735, a Task Termination routine will detect an ending of processing condition, and will issue a CLOSE SERVICE 20 routine. Therefore, in certain embodiments step 875 is performed by a controller disposed in a data storage and retrieval system, such as controller 160 (FIG. 1)/260 (FIG. 2)/322 (FIG. 3). In certain embodiments, step 875 is performed by the TCLOSE program.

In step 880, the CLOSE program detects that the DCBOWRIT bit is set to output, and instructs the information storage device to write to the information storage medium a trailer label1, such as trailer label1 660 (FIG. 6) comprising an embedded object count field. Applicants' method transitions from step 880 to step 885 wherein the CLOSE program instructs the information storage device to write to the information storage medium a trailer label2, such as trailer label2 665 (FIG. 6). Applicants' method transitions from step 885 to step 890 wherein the CLOSE program instructs the information storage device to write to the information storage medium an Object Information Block, such as Object Information Block 670 (FIG. 6).

Applicants' method transitions from step 890 to step 895 wherein the CLOSE program writes a file mark, such as tape mark 680 (FIG. 6), adjacent the Object Information Block of step 890. Applicants' method transitions from step 895 to step 899 wherein the CLOSE program writes an end of file mark, such as end of file mark 690 (FIG. 6).

FIG. 9 summarizes the steps of Applicants' method to read information written to an information storage medium using the format of FIG. 6. In various embodiments of Applicants' method, the operating system resident on the one or more host computers, such as host 390 (FIG. 3), provides several methods for accessing data stored external to the CPU. In certain embodiments, for example, users, i.e. the host computers, accept responsibility for all data access and organization (EXCP access). In other embodiments, users ask for the data and wait for an access method routine to deliver the data to the program.

Such access methods operate the computing system to move information between virtual storage and external storage, and maintain it in external storage. As those skilled in the art will appreciate, a variety of techniques and data set organizations are known for gaining access to a data set. Using Applicants' method to read information written to an information storage medium using the format of FIG. 6, a variety of data set organizations may be employed, including sequential access methods. Basic access methods include, for example, basic sequential access methods (BSAM). BSAM sequentially organizes data and stores or retrieves physical blocks of data.

Queued access methods, which can be used only with sequential data set organizations, include queued sequential access methods ("QSAM"). QSAM organizes data sequentially. It retrieves and stores logical records as requested. QSAM anticipates the need for records based on their sequential order, and normally has the desired record in virtual storage, ready for use before the request for retrieval. When writing data to external storage, the program normally continues as if the record has been written immediately although QSAM's routines may block it with other logical records, and defer the actual writing until the output buffer has been filled.

Referring now to FIG. 9, in step 905 Applicants' method issues an OPEN SL OUTPUT command comprising an Object Processing Indicator. In certain embodiments, step 905 is performed by a host computer, such as host computer 390 (FIGS. 1, 3). In certain embodiments, step 905 is performed by an application running on a host computer. In certain embodiments, such an application includes an application programming interface which includes an Object Processing Indicator. In certain embodiments, such an Object Processing Indicator comprises a flag which can be turned "on" or "off." In certain embodiments, such as Object Processing Indicator comprises a bit which can be set to indicate object processing.

Applicants' method transitions from step 905 to step 910 wherein the method issues a TCLOSE INPUT command comprising the name of the object requested or a volume list and the sequence number of the object requested. In certain embodiments, step 910 is performed by a host computer. In certain embodiments, step 910 is performed by an application running on a host computer.

Applicants' method transitions from step 910 to step 915 wherein the method determines if the requested object is cataloged. In certain embodiments, step 915 is performed by a host computer. In certain embodiments, step 915 is performed by a library controller, such as controller 160 (FIG. 1)/260 (FIG. 2)/322 (FIG. 3). In certain embodiments, step 915 is performed by the TCLOSE program.

If Applicants' method determines in step 915 that the requested object is cataloged, then the method transitions from step 915 to step 925 wherein the method calls the catalog and determines a subset volume list. In certain embodiments, step 925 is performed by a host computer. In certain embodiments, step 925 is performed by a library controller, such as controller 160 (FIG. 1)/260 (FIG. 2)/322 (FIG. 3). In certain embodiments, step 925 is performed by the TCLOSE program. Applicants' method transitions from step 925 to step 930.

If Applicants' method determines in step 915 that the requested object is not cataloged, then the method transitions from step 915 to step 920 wherein the method verifies that the first volume recited in the volume list of step 915 comprises the first volume to which the requested object is written. In certain embodiments, step 925 is performed by a host computer. In certain embodiments, step 925 is performed by a library controller, such as controller 160 (FIG. 1)/260 (FIG. 2)/322 (FIG. 3). In certain embodiments, step 925 is performed by the TCLOSE program.

Applicants' method transitions from step 920 to step 930 wherein the method builds an in-storage table using the information of step 910 or step 925. In certain embodiments, step 930 is performed by a host computer. In certain embodiments, step 930 is performed by a library controller, such as controller 160 (FIG. 1)/260 (FIG. 2)/322 (FIG. 3). In certain embodiments, step 930 is performed by the TCLOSE program.

Applicants' method transitions from step 930 to step 935 wherein the method mounts the first volume comprising the requested object. In certain embodiments, step 935 includes causing an accessor, such as accessor 110 (FIG. 1)/210 (FIG. 2), to retrieve a designated information storage medium, such as information storage medium 381 (FIG. 1) or tape 600 FIG. 6), transport that designated information storage medium to a designated information storage device, such as information storage device 130 (FIG. 1)/140 (FIG. 1)/230 (FIG. 2)/330 (FIG. 3)/340 (FIG. 3), and insert that designated information storage medium into the designated information storage device. In certain embodiments, step 935 is performed by a host computer. In certain embodiments, step 935 is performed by a library controller, such as controller 160 (FIG. 1)/260 (FIG. 2)/322 (FIG. 3). In certain embodiments, step 935 is performed by the TCLOSE program.

Applicants' method transitions from step 935 to step 940 wherein the method locates and reads the object information block, such as object information block 670 (FIG. 6), written to the designated information storage medium. In certain embodiments, step 940 further includes copying information read from the Object Information Block to the in-storage table of step 930.

In certain embodiments, operation of the information storage device in step 940 is controlled by a host computer, such as host computer 390 (FIGS. 1, 3). In certain embodiments, operation of the information storage device in step 940 is controlled by a library controller, such as controller 160 (FIG. 1)/260 (FIG. 2)/322 (FIG. 3). In certain embodiments, operation of the information storage device in step 940 is controlled by the OPEN program. In certain embodiments, operation of the information storage device in step 940 is controlled by a device controller, such as device controller 132 (FIG. 1)/142 (FIG. 1)/232 (FIG. 2)/332 (FIG. 3)/342 (FIG. 3). In certain embodiments, the information storage device is operated in step 940 by both a library controller and a device controller.

Applicants' method transitions from step 940 to step 945 wherein the method fast positions the information storage medium such that the requested object can be read from the designated information storage medium by the information storage device. As those skilled in the art will appreciate, step 945 includes moving the information storage medium such that the read head disposed in the information storage device is positioned at/above the starting blockid for the requested object.

In certain embodiments, operation of the information storage device in step 945 is controlled by a host computer, such as host computer 390 (FIGS. 1, 3). In certain embodiments, operation of the information storage device in step 945 is controlled by a library controller, such as controller 160 (FIG. 1)/260 (FIG. 2)/322 (FIG. 3). In certain embodiments, operation of the information storage device in step 945 is controlled by the TCLOSE program. In certain embodiments, operation of the information storage device in step 945 is controlled by a device controller, such as device controller 132 (FIG. 1)/142 (FIG. 1)/232 (FIG. 2)/332 (FIG. 3)/342 (FIG. 3). In certain embodiments, the information storage device is operated in step 945 by both a library controller and a device controller.

Applicants' method transitions from step 945 to step 950 wherein the method reads the requested object. In certain embodiments, operation of the information storage device in step 950 is controlled by a host computer, such as host computer 390 (FIGS. 1, 3). In certain embodiments, operation of the information storage device in step 950 is controlled by a library controller, such as controller 160 (FIG. 1)/260 (FIG. 2)/322 (FIG. 3). In certain embodiments, operation of the information storage device in step 950 is controlled by the TCLOSE program. In certain embodiments, operation of the information storage device in step 950 is controlled by a device controller, such as device controller 132 (FIG. 1)/142 (FIG. 1)/232 (FIG. 2)/332 (FIG. 3)/342 (FIG. 3). In certain embodiments, the information storage device is operated in step 950 by both a library controller and a device controller.

Applicants' method transitions from step 950 to step 955 wherein the method obtains the ending blockid for the requested object from the table of step 930, and determines if that ending blockid has been read. In certain embodiments, step 955 is performed by a host computer. In certain embodiments, step 955 is performed by a library controller, such as controller 160 (FIG. 1)/260 (FIG. 2)/322 (FIG. 3). In certain embodiments, step 955 is performed by the OPEN program.

If Applicants' method determines in step 955 that the ending blockid has not been read, then the method continues to read the requested object from the information storage medium. Alternatively, if the method determines in step 955 that the ending blockid has been read, then Applicants' method transitions from step 955 to step 960 wherein the method passes control back to the requesting host computer application. In certain embodiments, step 960 is performed by a library controller, such as controller 160 (FIG. 1)/260 (FIG. 2)/322 (FIG. 3). In certain embodiments, step 960 is performed by the OPEN program.

Applicants' method transitions from step 960 to step 970 wherein the method determines if there are additional objects to read. In certain embodiments, step 970 is performed by a host computer. In certain embodiments, step 970 is performed by an application running on a host computer. If Applicants' method determines in step 970 that no further read requests are pending, then the method transitions from step 970 to step 980 and ends. Alternatively, if Applicants' method determines in step 970 that additional read requests are pending, then the method transitions from step 970 to step 1010 (FIG. 10).

Figure 10:
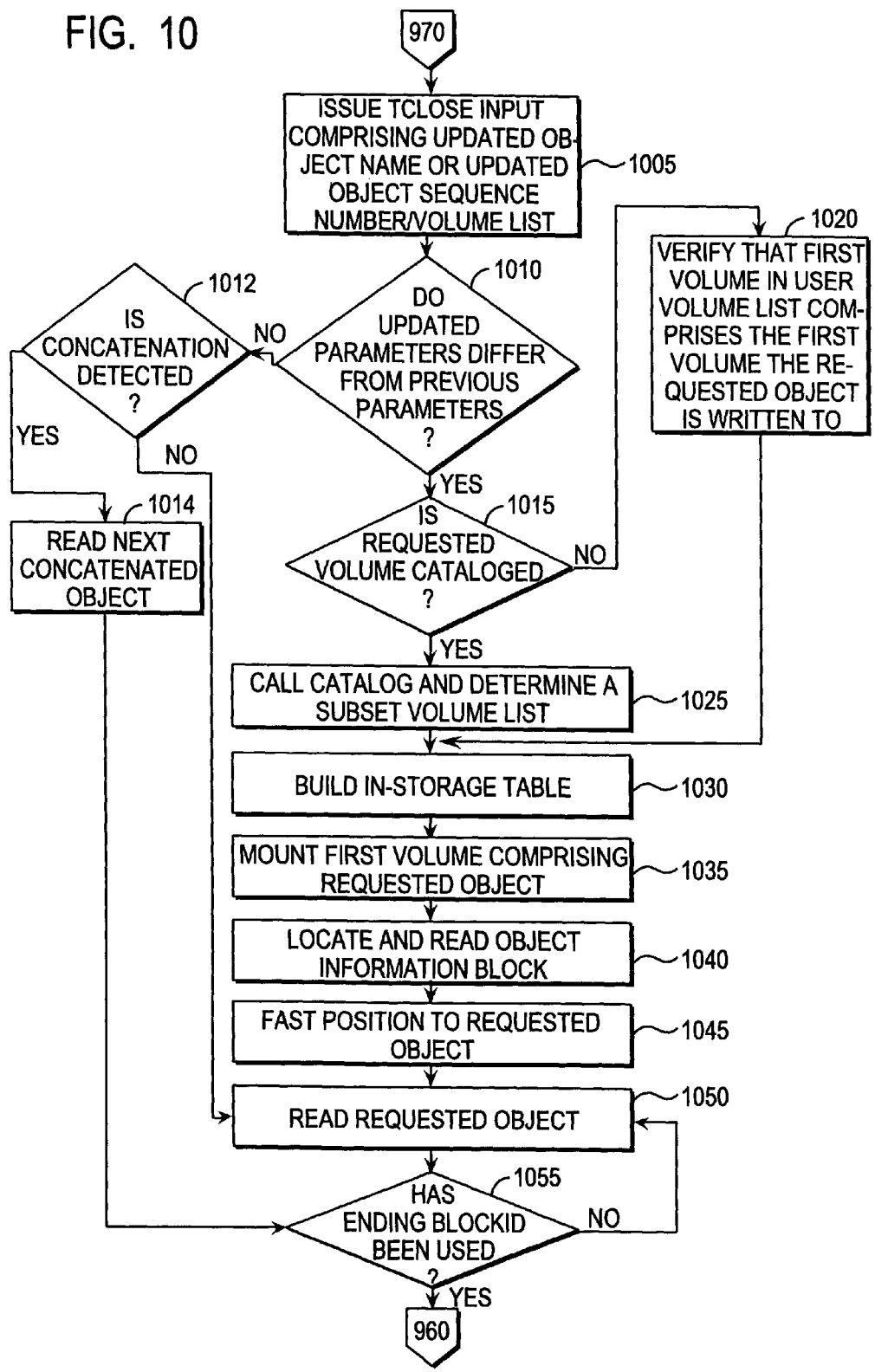
FIG. 10 is a flowchart summarizing additional steps in Applicants' method to read information from an information storage medium.

Referring now to FIG. 10, in step 1005 Applicants' method issues a TCLOSE INPUT command comprising a second object name or a second object sequence number/volume list. In certain embodiments, step 1005 is performed by a host computer. In certain embodiments, step 1005 is performed by an application running on a host computer.

Applicants' method transitions from step 1005 to step 1010 wherein the method determines if the second object name, or alternatively the second object sequence number/volume list of step 1005 differs from the first object name, or alternatively the first object sequence number/volume list of step 910. In certain embodiments, step 1010 is performed by a host computer. In certain embodiments, step 1010 is performed by a library controller, such as controller 160 (FIG. 1)/260 (FIG. 2)/322 (FIG. 3). In certain embodiments, step 1010 is performed by the TCLOSE program.

If Applicants' method determines in step 1010 that the second object name, or alternatively the second object sequence number/volume list differs from the first object name, or alternatively the first object sequence number/volume list, then the method transitions from step 1010 to step 1015 wherein the method determines if the requested object is cataloged. In certain embodiments, step 1015 is performed by a host computer. In certain embodiments, step 1015 is performed by a library controller, such as controller 160 (FIG. 1)/260 (FIG. 2)/322 (FIG. 3). In certain embodiments, step 1015 is performed by the TCLOSE program.

If Applicants' method determines in step 1015 that the requested object is cataloged, then the method transitions from step 1015 to step 1025 wherein the method calls the catalog and determines a subset volume list. In certain embodiments, step 1025 is performed by a host computer. In certain embodiments, step 1025 is performed by a library controller, such as controller 160 (FIG. 1)/260 (FIG. 2)/322

(FIG. 3). In certain embodiments, step 1025 is performed by the TCLOSE program. Applicants' method transitions from step 925 to step 930.

If Applicants' method determines in step 1015 that the requested object is not cataloged, then the method transitions from step 1015 to step 1020 wherein the method verifies that the first volume recited in the volume list of step 1015 comprises the first volume to which the requested object is written. In certain embodiments, step 1025 is performed by a host computer. In certain embodiments, step 1025 is performed by a library controller, such as controller 160 (FIG. 1)/260 (FIG. 2)/322 (FIG. 3). In certain embodiments, step 1025 is performed by the TCLOSE program.

Applicants' method transitions from step 1020 to step 1030 wherein the method builds an in-storage table using the information of step 1020 or step 1025. In certain embodiments, step 1030 is performed by a host computer. In certain embodiments, step 1030 is performed by a library controller, such as controller 160 (FIG. 1)/260 (FIG. 2)/322 (FIG. 3). In certain embodiments, step 1030 is performed by the TCLOSE program.

Applicants' method transitions from step 1030 to step 1035 wherein the method mounts the first volume comprising the requested object. In certain embodiments, step 1035 includes causing an accessor, such as accessor 110 (FIG. 1)/210 (FIG. 2), to retrieve a designated information storage medium, such as information storage medium 381 (FIG. 1) or tape 600 (FIG. 6), transport that designated information storage medium to a designated information storage device, such as information storage device 130 (FIG. 1)/140 (FIG. 1)/230 (FIG. 2)/330 (FIG. 3)/340 (FIG. 3), and insert that designated information storage medium into the designated information storage device. In certain embodiments, step 1035 is performed by a host computer. In certain embodiments, step 1035 is performed by a library controller, such as controller 160 (FIG. 1)/260 (FIG. 2)/322 (FIG. 3). In certain embodiments, step 1035 is performed by the TCLOSE program.

Applicants' method transitions from step 1035 to step 1040 wherein the method locates and reads the object information block, such as object information block 670 (FIG. 6), written to the designated information storage medium. In certain embodiments, step 1040 further includes copying information read from the Object Information Block to the in-storage table of step 1030.

In certain embodiments, operation of the information storage device in step 1040 is controlled by a host computer, such as host computer 390 (FIGS. 1, 3). In certain embodiments, operation of the information storage device in step 1040 is controlled by a library controller, such as controller 160 (FIG. 1)/260 (FIG. 2)/322 (FIG. 3). In certain embodiments, operation of the information storage device in step 1040 is controlled by the OPEN program. In certain embodiments, operation of the information storage device in step 1040 is controlled by a device controller, such as device controller 132 (FIG. 1)/142 (FIG. 1)/232 (FIG. 2)/332 (FIG. 3)/342 (FIG. 3). In certain embodiments, the information storage device is operated in step 1040 by both a library controller and a device controller.

Applicants' method transitions from step 1040 to step 1045 wherein the method fast positions the information storage medium such that the requested object can be read from the designated information storage medium by the information storage device. In certain embodiments, operation of the information storage device in step 1045 is controlled by a host computer, such as host computer 390 (FIGS. 1, 3). In certain embodiments, operation of the information storage device in step 1045 is controlled by a library controller, such as controller 160 (FIG. 1)/260 (FIG. 2)/322 (FIG. 3). In certain embodiments, operation of the information storage device in step 1045 is controlled by the OPEN program. In certain embodiments, operation of the information storage device in step 1045 is controlled by a device controller, such as device controller 132 (FIG. 1)/142 (FIG. 1)/232 (FIG. 2)/332 (FIG. 3)/342 (FIG. 3). In certain embodiments, the information storage device is operated in step 1045 by both a library controller and a device controller.

Applicants' method transitions from step 1045 to step 1050 wherein the method reads the requested object. In certain embodiments, operation of the information storage device in step 1050 is controlled by a host computer, such as host computer 390 (FIGS. 1, 3). In certain embodiments, operation of the information storage device in step 1050 is controlled by a library controller, such as controller 160 (FIG. 1)/260 (FIG. 2)/322 (FIG. 3). In certain embodiments, operation of the information storage device in step 1050 is controlled by the OPEN program. In certain embodiments, operation of the information storage device in step 1050 is controlled by a device controller, such as device controller 132 (FIG. 1)/142 (FIG. 1)/232 (FIG. 2)/332 (FIG. 3)/342 (FIG. 3). In certain embodiments, the information storage device is operated in step 1050 by both a library controller and a device controller.

Applicants' method transitions from step 1050 to step 1055 wherein the method obtains the ending blockid for the requested object from the table of step 1030, and determines if that ending blockid has been read. In certain embodiments, step 1055 is performed by a host computer. In certain embodiments, step 1055 is performed by a library controller, such as controller 160 (FIG. 1)/260 (FIG. 2)/322 (FIG. 3). In certain embodiments, step 1055 is performed by the OPEN program.

If Applicants' method determines in step 1055 that the ending blockid has not been read, then the method continues to read the requested object from the information storage medium. Alternatively, if the method determines in step 1055 that the ending blockid has been read, then Applicants' method transitions from step 1055 to step 960 wherein the method passes control back to the requesting host computer application and continues.

If Applicants' method determines in step 1010 that the second object name, or alternatively the second object sequence number/volume list, does not differ from the first object name, or alternatively from the first object sequence number/volume list, then Applicants' method transitions from step 1010 to step 1012 wherein the method determines if concatenation is detected. As those skilled in the art will appreciate, concatenation is detected where the requested object comprises two or more object names in sequence. In certain embodiments, step 1012 is performed by a host computer. In certain embodiments, step 1012 is performed by a library controller, such as controller 160 (FIG. 1)/260 (FIG. 2)/322 (FIG. 3). In certain embodiments, step 1012 is performed by the TCLOSE program.

If Applicants' method determines in step 1012 that concatenation is detected, then Applicants' method transitions from step 1012 to step 1014 wherein the method reads the next concatenated object. Applicants' method transitions from step 1014 to step 1055. If Applicants' method determines in step 1012 that concatenation is not detected, then Applicants' method transitions from step 1012 to step 1050 and again reads the first requested object.

The embodiments of Applicants' method recited in FIGS. 7, 8, 9, and/or 10, may be implemented separately. Moreover, in certain embodiments, the individual steps recited in FIGS. 7, 8A, 8B, 9, and/or 10, may be combined, eliminated, or reordered.

Applicants' invention includes an article of manufacture comprising a computer useable medium, such as computer useable medium 314 (FIG. 3) and/or 324 (FIG. 3), having computer readable program code disposed therein for implementing the steps of FIGS. 7, and/or 8A, and/or 8B. Applicants' invention includes an article of manufacture comprising a computer useable medium, such as computer useable medium 314 (FIG. 3) and/or 324 (FIG. 3), having computer readable program code disposed therein for implementing the steps of FIGS. 9 and/or 10.

Applicants' invention further includes computer program products, such as computer program product 316 (FIG. 3) and/or 326 (FIG. 3), embodied as program code disposed therein for implementing the steps of FIGS. 7, and/or 8A, and/or 8B. Applicants' invention further includes computer program products, such as computer program product 316 (FIG. 3) and/or 326 (FIG. 3), embodied as program code disposed therein for implementing the steps of FIGS. 9 and/or 10. Such program readable code may be stored in one or more memory devices, such as a magnetic disk, a magnetic tape, or other non-volatile memory devices.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to write information to an information storage medium, comprising the steps of:
    creating one or more objects comprising information;
    providing a first one of said one or more objects, wherein said first object comprises one or more computer files;
    providing an information storage medium comprising a plurality of blockid addresses;
    writing a header label to said information storage medium, wherein said header label comprises an object processing indicator;
    assigning a first sequence number to said first object;
    writing said first object to said information storage medium beginning at a first blockid and ending at a second blockid;
    writing a trailer label to said information storage medium, wherein said trailer label comprises an embedded object field count;
        writing an object information block to said information storage medium,
    wherein said object information block comprises said first sequence number, said first blockid, and said second blockid;
    determining if a user name is assigned to said first object;
    operative if a user name is assigned to said first object, writing said user name to said object information block.

2. The method of claim 1, further comprising the steps of:
    providing a catalog comprising a database of object sequence numbers and volume lists;
    determining if a request to catalog said first object is detected;
    operative if a request to catalog said first object is detected, writing said first sequence number to said catalog;
    operative if a request to catalog said first object is detected and if a user name is assigned to said first object, writing said first sequence number and said user name to said catalog.

3. A method to write information to an information storage medium, comprising the steps of:
    creating one or more objects comprising information;
    providing a first one of said one or more objects, wherein said first object comprises one or more computer files;
    providing an information storage medium comprising a plurality of blockid addresses;
    writing a header label to said information storage medium, wherein said header label comprises an object processing indicator;
    assigning a first sequence number to said first object;
    writing said first object to said information storage medium beginning at a first blockid and ending at a second blockid;
    writing a trailer label to said information storage medium, wherein said trailer label comprises an embedded object field count;
        writing an object information block to said information storage medium, wherein said object information block comprises said first sequence number, said first blockid, and said second blockid;
    providing a second one of said one or more objects;
    assigning a second sequence number to said second object;
    writing said second object to said information storage medium, wherein said second object is written beginning at a third blockid and ending at a fourth blockid, wherein said second blockid comprises the (n)th blockid for said information storage medium, and wherein said third blockid comprising the (n+1)th blockid;
    writing to said object information block said second sequence number, said third blockid, and said fourth blockid.

4. A method to read information using an information storage device comprising a read head, comprising the steps of:
    providing an information storage medium comprising a plurality of blockid addresses, a header label comprising an object processing indicator, a trailer label comprising an embedded object field count, one or more objects comprising information written between said header label and said trailer label, and an object information block comprising an object sequence number, a volume identifier, a starting blockid, and an ending blockid, for each of said one or more objects;
    receiving a request to read a first one of said one or more objects;
    mounting said information storage medium in said information storage device;
    reading said object information block;
    determining the starting blockid and the ending blockid for said first object;
    positioning said information storage medium such that said read head is disposed adjacent said information storage medium at the starting blockid for said first object;
    reading said first object;
    determining if said first object is cataloged;
    operative if said first object is cataloged, calling said catalog;
    determining a list of volumes comprising said first object.

5. The method of claim 4, further comprising the steps of:
  determining if the ending blockid for said first object has been read by said read head;
  operative if said ending blockid has not been read by said read head, continuing to read said first object.

6. The method of claim 4, wherein said request comprises a first object name, further comprising the steps of:
  receiving a second request to read one of said one or more objects, wherein said second request comprises a second object name;
  determining if said second object name differs from said first object name;
  operative if said second object name differs from said first object name reading said second object;
  operative if said second object name does not differ from said first object name, determining if concatenation is detected;
  operative if concatenation is detected, reading said next concatenated object;
  operative if said second object name does not differ from said first object name and if concatenation is not detected, reading said first object.

7. An article of manufacture comprising a computer readable medium having computer readable program code disposed therein to write information to an information storage medium, the computer readable program code comprising a series of computer readable program steps to effect:
  creating one or more objects comprising information;
  providing a first one of said one or more objects, wherein said first object comprises one or more computer files;
  providing an information storage medium comprising a plurality of blockid addresses;
  writing a header label to said information storage medium, wherein said header label comprises an object processing indicator;
  assigning a first sequence number to said first object;
  writing said first object to said information storage medium beginning at a first blockid and ending at a second blockid;
  writing a trailer label to said information storage medium, wherein said trailer label comprises an embedded object field count;
  writing an object information block to said information storage medium, wherein said object information block comprises said first sequence number, said first blockid, and said second blockid;
  determining if a user name is assigned to said first object;
  operative if a user name is assigned to said first object, writing said user name to said object information block.

8. The article of manufacture of claim 7, said computer readable program code further comprising a series of computer readable program steps to effect:
  providing a catalog comprising a database of object sequence numbers and volume lists;
  determining if a request to catalog said first object is detected;
  operative if a request to catalog said first object is detected, writing said first sequence number to said catalog;
  operative if a request to catalog said first object is detected and if a user name is assigned to said first object, writing said first sequence number and said user name to said catalog.

9. An article of manufacture comprising a computer readable medium having computer readable program code disposed therein to write information to an information storage medium, the computer readable program code comprising a series of computer readable program steps to effect:
  creating one or more objects comprising information;
  providing a first one of said one or more objects, wherein said first object comprises one or more computer files;
  providing an information storage medium comprising a plurality of blockid addresses;
  writing a header label to said information storage medium, wherein said header label comprises an object processing indicator;
  assigning a first sequence number to said first object;
  writing said first object to said information storage medium beginning at a first blockid and ending at a second blockid;
  writing a trailer label to said information storage medium, wherein said trailer label comprises an embedded object field count;
  writing an object information block to said information storage medium, wherein said object information block comprises said first sequence number, said first blockid, and said second blockid;
  providing a second one of said one or more objects;
  assigning a second sequence number to said second object;
  writing said second object to said information storage medium, wherein said second object is written beginning at a third blockid and ending at a fourth blockid, wherein said second blockid comprises the (n)th blockid for said information storage medium, and wherein said third blockid comprising the (n+1)th blockid;
  writing to said object information block said second sequence number, said third blockid, and said fourth blockid.

10. An article of manufacture comprising a computer readable medium having computer readable program code disposed therein to read information from an information storage medium, the computer readable program code comprising a series of computer readable program steps to effect:
  retrieving an information storage medium comprising a plurality of blockid addresses, a header label comprising an object processing indicator, a trailer label comprising an embedded object field count, one or more objects comprising information written between said header label and said trailer label, and an object information block comprising a starting blockid and an ending blockid for each of said one or more objects;
  receiving a request to read a first one of said one or more objects;
  mounting said information storage medium in an information storage device comprising a read bead;
  reading said object information block;
  determining the starting blockid and the ending blockid for said first object;
  positioning said information storage medium such that said read head is disposed adjacent said information storage medium at the starting blockid for said first object;
  reading said first object
  determining if said first object is cataloged;
  operative if said first object is cataloged, calling said catalog;
  determining a list of volumes comprising said first object.

11. The article of manufacture of claim 10, said computer readable program code further comprising a series of computer readable program steps to effect:

determining if said ending blockid has been read by said article of manufacture;

operative if said ending blockid has not been read, continuing to read said first object by said article of manufacture.

12. The article of manufacture of claim 10, wherein said request comprises a first object name, said computer readable program code further comprising a series of computer readable program steps to effect:

receiving a second request to read one of said one or more objects, wherein said second request comprises a second object name;

determining if said second object name differs from said first object name;

operative if said second object name differs from said first object name, reading said second object;

operative if said second object name does not differ from said first object name, determining if concatenation is detected;

operative if concatenation is detected, reading said next concatenated object;

operative if said second object name does not differ from said first object name and if concatenation is not detected, reading said first object.

13. A computer readable medium having a computer program product usable with a programmable computer processor having computer readable program code embodied therein to read information from an information storage medium, comprising:

computer readable program code which causes said programmable computer processor to receive a first object comprising information;

computer readable program code which causes said programmable computer processor to removeably dispose an information storage medium comprising a plurality of blockid addresses in a information storage device;

computer readable program code which causes said programmable computer processor to write a header label to said information storage medium, wherein said header label comprises an object processing indicator;

computer readable program code which causes said programmable computer processor to assign a first sequence number to said first object;

computer readable program code which causes said programmable computer processor to write said first object to said information storage medium beginning at a first blockid and ending at a second blockid;

computer readable program code which causes said programmable computer processor to write a trailer label to said information storage medium, wherein said trailer label comprises an embedded object field count;

computer readable program code which causes said programmable computer processor to write an object information block to said information storage medium, wherein said object information block comprises said first sequence number, said first blockid, and said second blockid;

computer readable program code which causes said programmable computer processor to determine if a user name is assigned to said first object;

computer readable program code which, if a user name is assigned to said first object, causes said programmable computer processor to write said user name to said object information block.

14. A computer readable medium having a computer program product usable with a programmable computer processor having computer readable program code embodied therein to read information from an information storage medium, comprising:

computer readable program code which causes said programmable computer processor to receive a first object comprising information;

computer readable program code which causes said programmable computer processor to removeably dispose an information storage medium comprising a plurality of blockid addresses in a information storage device;

computer readable program code which causes said programmable computer processor to write a header label to said information storage medium, wherein said header label comprises an object processing indicator;

computer readable program code which causes said programmable computer processor to assign a first sequence number to said first object;

computer readable program code which causes said programmable computer processor to write said first object to said information storage medium beginning at a first blockid and ending at a second blockid;

computer readable program code which causes said programmable computer processor to write a trailer label to said information storage medium, wherein said trailer label comprises an embedded object field count;

computer readable program code which causes said programmable computer processor to write an object information block to said information storage medium, wherein said object information block comprises said first sequence number, said first blockid, and said second blockid;

computer readable program code which causes said programmable computer processor to determine if a request to catalog said first object is detected;

computer readable program code which, if a request to catalog said first object is detected, causes said programmable computer processor to retrieve a catalog comprising a database of object sequence numbers and volume lists and write said first sequence number to said catalog;

computer readable program code which, if a request to catalog said first object is detected and if a user name is assigned to said first object, causes said programmable computer processor to retrieve a catalog comprising a database of object sequence numbers and volume lists and to write said first sequence number and said user name to said catalog.

15. The computer readable medium of claim 14, wherein the computer program product further comprising:

computer readable program code which causes said programmable computer processor to receive a second object comprising information;

computer readable program code which causes said programmable computer processor to assign a second sequence number to said second object;

computer readable program code which causes said programmable computer processor to write said second object to said information storage medium, such that said second object is written beginning at a third blockid and ending at a fourth blockid, and such that said second blockid comprises the (n)th blockid for said information storage medium, and such that said third blockid comprising the (n+1)th blockid;

computer readable program code which causes said programmable computer processor to write to said object information block said second sequence number, said third blockid, and said fourth blockid.

16. A computer readable medium having computer readable program code usable with a programmable computer processor embodied therein to read information using an information storage device comprising a read head, comprising:
- computer readable program code which causes said programmable computer processor to retrieve an information storage medium comprising a plurality of blockid addresses, a header label comprising an object processing indicator, a trailer label comprising an embedded object field count, one or more objects comprising information written between said header label and said trailer label, and an off object information block comprising a starting blockid and an ending blockid for each of said one or more objects;
- computer readable program code which causes said programmable computer processor to receive a request to read a first one of said one or more objects;
- computer readable program code which causes said programmable computer processor to mount said information storage medium in said information storage device;
- computer readable program code which causes said programmable computer processor to read said object information block;
- computer readable program code which causes said programmable computer processor to determine the starting blockid and the ending blockid for said first object;
- computer readable program code which causes said programmable computer processor to position said information storage medium such that said read head is disposed adjacent said information storage medium at the starting blockid for said first object;
  - computer readable program code which causes said programmable computer processor to read said first object;
- computer readable program code which causes said programmable computer processor to determine if said first object is cataloged;
- computer readable program code which, if said first object is cataloged, causes said programmable computer processor to operative call said catalog;
- computer readable program code which causes said programmable computer processor to determine a list of volumes comprising said first object.

17. The computer readable medium of claim 16, further comprising:
- computer readable program code which causes said programmable computer processor to determine if the ending blockid for said first object has been read by said read head;
- computer readable program code which, if said ending blockid has not been read by said read head, causes said programmable computer processor to continue to read said first object.

18. The computer readable medium of claim 16, further comprising:
- computer readable program code which causes said programmable computer processor to receive a second request to read one of said one or more objects, wherein said second request comprises a second object name;
- computer readable program code which causes said programmable computer processor to determine if said second object name differs from said first object name;
- computer readable program code which, if said second object name differs from said first object name, causes said programmable computer processor to read said second object;
- computer readable program code which, if said second object name does not differ from said first object name, causes said programmable computer processor to determine if concatenation is detected;
- computer readable program code which, if concatenation is detected, causes said programmable computer processor to read the next concatenated object;
- computer readable program code which, if said second object name does not differ from said first object name and if concatenation is not detected, causes said programmable computer processor to read said first object.

* * * * *